United States Patent
Gomi

(10) Patent No.: US 9,769,171 B2
(45) Date of Patent: Sep. 19, 2017

(54) MANAGEMENT APPARATUS, MEMBERSHIP MANAGING METHOD, SERVICE PROVIDING APPARATUS, AND MEMBERSHIP MANAGING SYSTEM

(71) Applicant: YAHOO JAPAN CORPORATION, Tokyo (JP)

(72) Inventor: Hidehito Gomi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 801 days.

(21) Appl. No.: 13/959,325

(22) Filed: Aug. 5, 2013

(65) Prior Publication Data

US 2014/0157433 A1   Jun. 5, 2014

(30) Foreign Application Priority Data

Nov. 30, 2012  (JP) .................................. 2012-263469

(51) Int. Cl.
*H04L 29/06* (2006.01)
*G06Q 30/02* (2012.01)

(52) U.S. Cl.
CPC ......... *H04L 63/10* (2013.01); *G06Q 30/0226* (2013.01)

(58) Field of Classification Search
CPC ...... H04L 63/10; H04L 63/20; G06C 30/0226
USPC ...................................................... 726/1, 28
See application file for complete search history.

(56) References Cited

U.S. PATENT DOCUMENTS

| 5,379,344 A | * | 1/1995 | Larsson | ............... G06Q 20/341 235/380 |
| 5,448,047 A | * | 9/1995 | Nair | ....................... G06Q 20/04 235/437 |
| 5,638,431 A | * | 6/1997 | Everett | ................. H04M 3/382 379/114.01 |

(Continued)

FOREIGN PATENT DOCUMENTS

| JP | A-05-290274 | 11/1993 |
| JP | A-2002-279360 | 9/2002 |

(Continued)

OTHER PUBLICATIONS

"Recipient-confirmed Delivery Service (Fee-based)," retrieved Nov. 20, 2012. http://www.sagawa-exp.co.jp/service/kakunin/.

(Continued)

*Primary Examiner* — Kambiz Zand
*Assistant Examiner* — Tongoc Tran
(74) *Attorney, Agent, or Firm* — Oliff PLC

(57) ABSTRACT

A management apparatus stores a usable or non-usable state representing whether a right is usable or non-usable by a user in a facility in which a service is provided by a service provider using a service providing apparatus. And, the management apparatus updates the use usable or non-usable state to a non-usable state in a case where a use request of the right is received and transmits the use request to a terminal apparatus. And, the management apparatus permits the use of the right to the user by updating the usable or non-usable state to a usable state in a case where a notification of satisfaction is received from the terminal apparatus or the service providing apparatus, the notification of satisfaction indicating that the user, who requests the use of the right in the use request, satisfies a use requirements of the right.

17 Claims, 13 Drawing Sheets

(56) References Cited

U.S. PATENT DOCUMENTS

| | | | | | |
|---|---|---|---|---|---|
| 6,010,068 | A * | 1/2000 | Bozzo | | G06Q 20/042 |
| | | | | | 235/375 |
| 2001/0011944 | A1* | 8/2001 | Garrido-Gadea | | G06K 7/0021 |
| | | | | | 340/5.86 |
| 2002/0035539 | A1* | 3/2002 | O'Connell | | G06Q 20/02 |
| | | | | | 705/39 |
| 2003/0004866 | A1* | 1/2003 | Huennekens | | G06Q 20/042 |
| | | | | | 705/38 |
| 2004/0124246 | A1* | 7/2004 | Allen | | G06Q 20/108 |
| | | | | | 235/492 |
| 2009/0150295 | A1* | 6/2009 | Hatch | | G06Q 20/3552 |
| | | | | | 705/71 |
| 2009/0173782 | A1* | 7/2009 | Muscato | | G06Q 20/10 |
| | | | | | 235/379 |
| 2009/0327705 | A1* | 12/2009 | Ray | | G06F 21/10 |
| | | | | | 713/156 |
| 2012/0208466 | A1* | 8/2012 | Park | | G06F 1/1601 |
| | | | | | 455/41.3 |
| 2012/0227035 | A1* | 9/2012 | Obasanjo | | H04L 12/588 |
| | | | | | 717/176 |
| 2012/0240214 | A1* | 9/2012 | Ogura | | G06F 21/31 |
| | | | | | 726/12 |
| 2013/0124606 | A1* | 5/2013 | Carpenter | | H04L 67/06 |
| | | | | | 709/203 |
| 2013/0145172 | A1* | 6/2013 | Shablygin | | G06F 21/33 |
| | | | | | 713/185 |
| 2013/0247117 | A1* | 9/2013 | Yamada | | G08C 17/02 |
| | | | | | 725/93 |
| 2014/0108152 | A1* | 4/2014 | Wu | | G06Q 10/10 |
| | | | | | 705/14.66 |
| 2014/0150117 | A1* | 5/2014 | Yamahara | | G06F 21/31 |
| | | | | | 726/28 |
| 2016/0012444 | A1* | 1/2016 | Adams | | G06Q 20/341 |
| | | | | | 705/41 |
| 2016/0078530 | A1* | 3/2016 | Zhang | | G06Q 40/02 |
| | | | | | 705/35 |

FOREIGN PATENT DOCUMENTS

| | | | | |
|---|---|---|---|---|
| JP | A-2003-296477 | | 10/2003 | |
| JP | A-2004-5255 | | 1/2004 | |
| JP | 2004062772 | * | 2/2004 | G06F 17/60 |
| JP | A-2004-062722 | | 2/2004 | |
| JP | A-2005-165685 | | 6/2005 | |
| JP | A-2007-075399 | | 3/2007 | |
| JP | A-2011-70390 | | 4/2011 | |
| JP | A-2011-139919 | | 7/2011 | |
| WO | WO 01/75710 A1 | | 10/2001 | |

OTHER PUBLICATIONS

"Yahoo Auction Strengthen Identity Verification of Exhibitor, Sagawa Express Delivery Person Visually Recognizes Driver's License or the Like," retrieved Nov. 20, 2012. http://internet.watch.impress.co.jp/cda/news/2006/11/14/13940.html.

"Yahoo! Card Case," retrieved Nov. 20, 2012. http://promo.loco.yahoo.co.jp/mobile/cardcase/index.html.

Dec. 10, 2013 Japanese Office Action issued in Japanese Application No. 2012-263469 (with translation).

Japanese Office Action issued in Japanese Application No. 2012-263469 mailed Apr. 30, 2014 (with translation).

* cited by examiner

| MANAGEMENT-SIDE USER ID | PASSWORD | NAME | DATE OF BIRTH | ... |
|---|---|---|---|---|
| U01 | P01 | AAA | 1985/3/10 | ... |
| U02 | P02 | BBB | 1977/4/16 | ... |
| U03 | P03 | CCC | 1990/12/15 | ... |
| ... | ... | ... | ... | ... |

| MANAGEMENT-SIDE USER ID | LINK ID | CARD ID | PIN | USABLE OR NON-USABLE STATE | IDENTITY VERIFICATION DATE AND TIME | ... |
|---|---|---|---|---|---|---|
| U01 | L01 | C11 | V11 | IDENTITY VERIFICATION WAITING STATE | — | ... |
|  |  | C12 | V12 | IDENTITY VERIFICATION WAITING STATE | — | ... |
|  |  | C13 | V13 | USE PERMITTED STATE | 2012/11/01 10:40 | ... |
|  | ... | ... | ... | ... | ... | ... |
| U02 | L02 | C11 | V21 | USE PERMITTED STATE | 2012/11/13 17:50 | ... |
|  |  | ... | ... | ... | ... | ... |
| U03 | L03 | C14 | V31 | IDENTITY VERIFICATION WAITING STATE | — | ... |
|  |  | ... | ... | ... | ... | ... |
| ... |  |  |  |  |  |  |

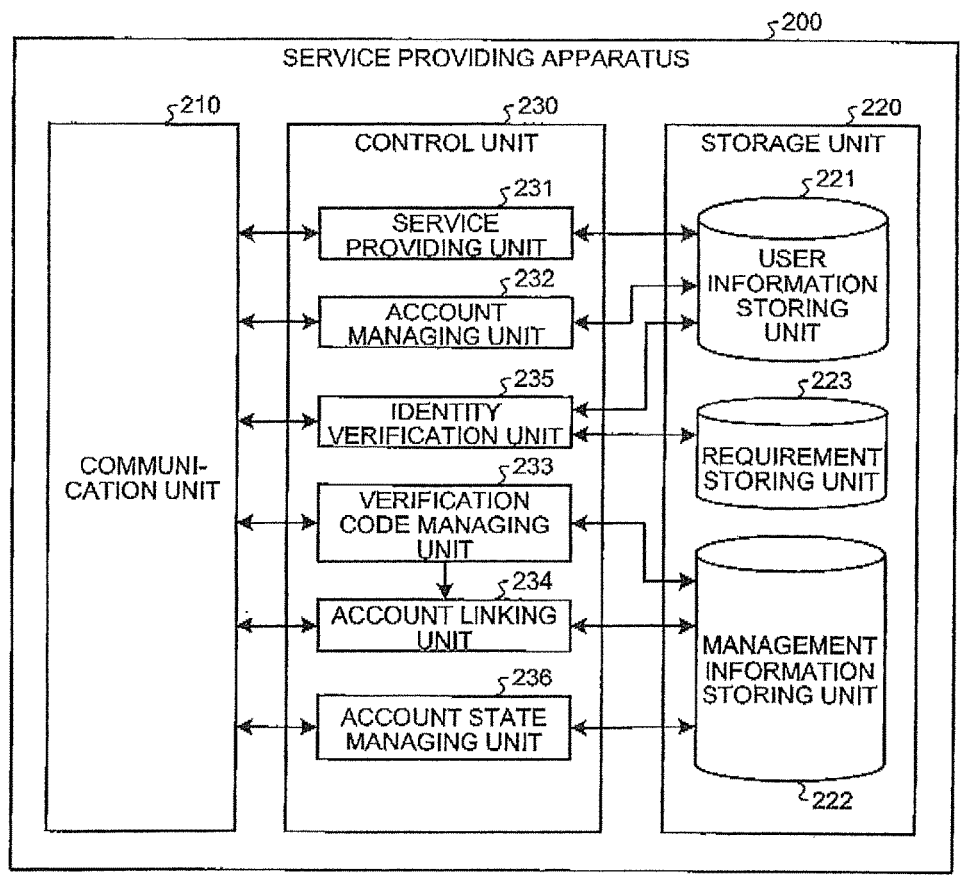

| PROVIDING-SIDE USER ID | LINK ID | PIN | VERIFIED STATE | ... |
|---|---|---|---|---|
| S01 | L01 | V11 | NO-IDENTITY VERIFIED STATE | ... |
| S02 | L02 | V21 | IDENTITY VERIFIED STATE | ... |
| ... | ... | ... | ... | ... |

| AGE | SEX | ... |
|---|---|---|
| OVER 18 YEARS | IGNORED | ... |

| CARD ID | BARCODE | STATE INFORMATION | ... |
|---|---|---|---|
| C11 | B11 | IDENTITY VERIFICATION WAITING STATE | ... |
| C12 | B12 | STORE-VISITING REQUESTED STATE | ... |
| C13 | B13 | USE PERMITTED STATE | ... |
| ... | ... | ... | ... |

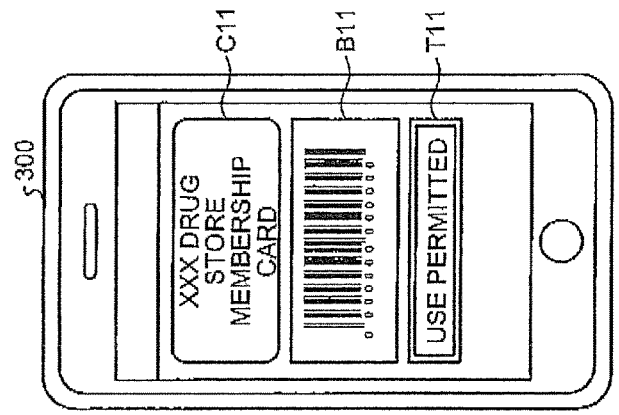
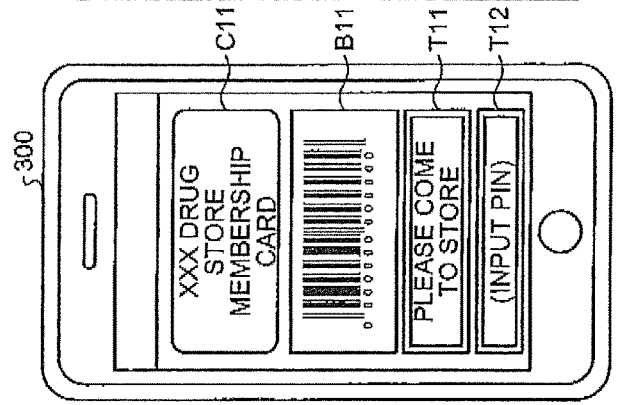
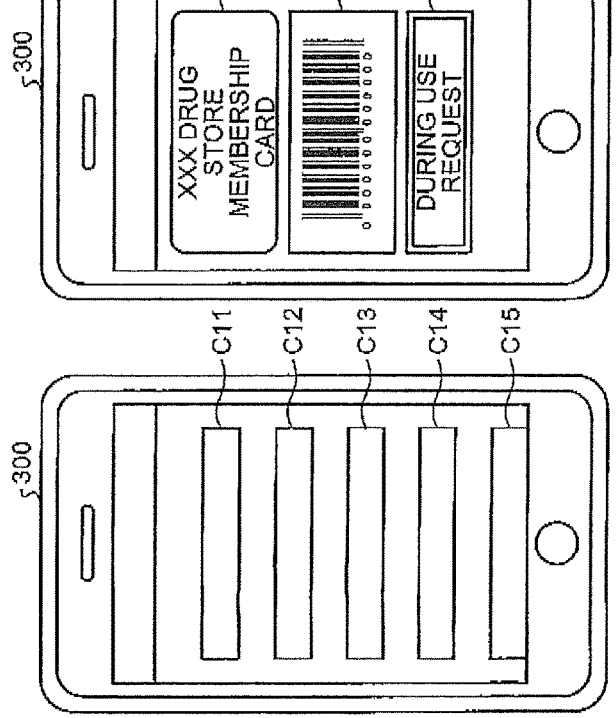

| STORE ID | PERMISSION CONDITION | ... |
|---|---|---|
| X01 | IDENTITY VERIFICATION | ... |
| X02 | IDENTITY VERIFICATION IN AFFILIATED STORE | ... |
| X03 | IDENTITY VERIFICATION IN ARBITRARY STORE WITHIN ONE YEAR | ... |
| X04 | IDENTITY VERIFICATION ONCE PER YEAR | ... |
| X05 | FEMALE OVER 18 YEARS OLD | ... |
| X06 | FEMALE OVER 22 YEARS OLD | ... |
| ... | ... | ... |

MANAGEMENT APPARATUS, MEMBERSHIP MANAGING METHOD, SERVICE PROVIDING APPARATUS, AND MEMBERSHIP MANAGING SYSTEM

CROSS-REFERENCE TO RELATED APPLICATIONS

The present application claims priority to and incorporates by reference the entire contents of Japanese Patent Application No. 2012-263469 filed in Japan on Nov. 30, 2012.

BACKGROUND OF THE INVENTION

1. Field of the Invention

The present invention relates to a management apparatus, a membership managing method, a service providing apparatus, and a membership managing system.

2. Description of the Related Art

Conventionally, as a method for sales promotion in a store, it is known that membership services such as a point service and a stamp service are provided. In such membership services, for example, a user to be a member writes user information such as name and sex in a register of a store or the like, and the store side issues a membership card such as a point card or a stamp card.

In recent years, technologies for supporting membership registration for a store have been known (for example, see Japanese Laid-open Patent Publication No. 2011-070390). By using such technologies, a membership may be issued without requiring user's effort for writing user information.

However, according to the conventional technologies described above, there is concern that a membership card may be issued also to a user not satisfying user requirements for membership registration. For example, in a store providing a female-limited service or a residential area-limited service, there is a case where an age limit or a sex limit is set as a requirement for the membership registration of a user. As above, in each store, the requirements for the membership registration of a user may be included as a security policy. Under such a situation, according to the conventional technologies described above, only the membership registration is supported, and it is difficult to issue a membership card corresponding to a security policy of each store.

SUMMARY OF THE INVENTION

According to one aspect of an embodiment, a management apparatus includes a usable or non-usable storing unit that stores a usable or non-usable state representing whether a right is usable or non-usable by a user in a facility in which a service is provided by a service provider using a service providing apparatus, a transmission unit that updates the usable or non-usable state stored in the usable or non-usable storing unit to a non-usable state representing that the right is non-usable in a case where a use request of the right is received from the terminal apparatus of the user and that transmits the use request to the terminal apparatus or the service providing apparatus, and a permission unit that permits the use of the right to the user by updating the usable or non-usable state to a usable state representing that the right is usable in a case where a notification of satisfaction is received from the terminal apparatus or the service providing apparatus, the notification of satisfaction indicating that the user, who requests the use of the right in the use request transmitted from the transmission unit, satisfies a use requirements of the right.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram that illustrates an example of a management information storing unit according to the first embodiment;

FIG. 6 is a diagram that illustrates an example of the configuration of a service providing apparatus according to the first embodiment;

FIG. 7 is a diagram that illustrates an example of a user information storing unit according to the first embodiment;

FIG. 8 is a diagram that illustrates an example of a management information storing unit according to the first embodiment;

FIG. 9 is a diagram that illustrates an example of a requirement storing unit according to the first embodiment;

FIGS. 12A to 12D are diagrams that illustrate an example of a screen displayed by a card application control unit according to the first embodiment;

DETAILED DESCRIPTION OF THE PREFERRED EMBODIMENTS

Hereinafter, a management apparatus, a membership managing program, a membership managing method, a service providing apparatus, a membership card managing program, and a membership managing system according to embodiments (hereinafter, referred to as embodiments) relating to this application will be described in detail with reference to the drawings. However, the membership managing system and the like relating to this application are not limited by these embodiments. In the following embodiments, the same reference sign is assigned to the same portions, and duplicate description thereof will not be presented.

First Embodiment 1-1. Configuration of Membership Managing System

Figure 1:
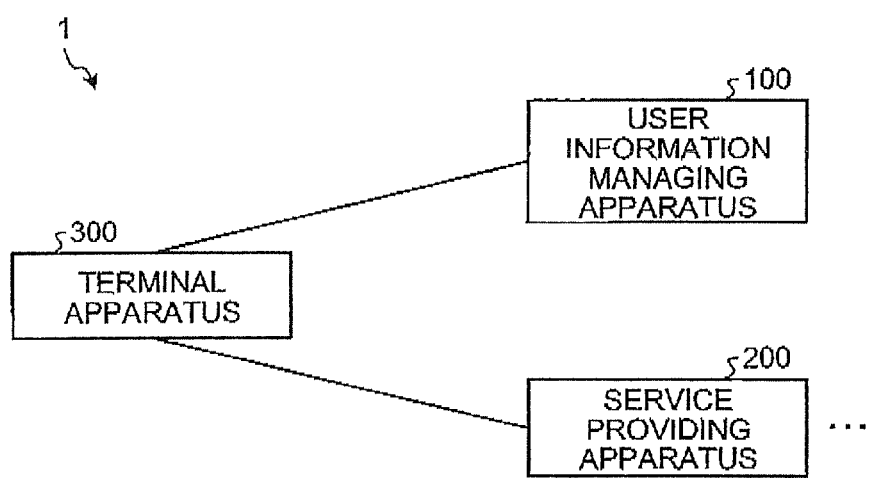
FIG. 1 is a diagram that illustrates an example of the configuration of a membership managing system according to a first embodiment.

First, the configuration of a membership managing system 1 according to a first embodiment will be described with reference to FIG. 1. As illustrated in FIG. 1, the membership managing system 1 according to the first embodiment includes a user information managing apparatus 100, a service providing apparatus 200, and a terminal apparatus 300. The user information managing apparatus 100, the service providing apparatus 200, and the terminal apparatus 300 are interconnected to be communicable with each other through a network such as the Internet. Although an example in FIG. 1 is illustrated in which one service providing apparatus 200 and one terminal apparatus 300 are included in the membership managing system 1, a plurality of service providing apparatuses 200 and a plurality of terminal apparatuses 300 may be included in the membership managing system 1.

The user information managing apparatus 100 is a server apparatus that manages various kinds of information relating to a user using the terminal apparatus 300. The service providing apparatus 200 is a server apparatus used by a service provider providing various services in an actual facility (for example, a store, an event site, or a public office). The terminal apparatus 300, for example, is a mobile terminal such as a smartphone or a personal digital assistant (PDA), a tablet personal computer (PC), a notebook PC, or a desktop PC.

The membership managing system 1 illustrated in FIG. 1 issues a right for receiving a service in an actual facility in which various services are provided by a service provider to a user satisfying requirements of the service provider for membership registration. In the following embodiments, the issuance of an electronic membership card that can be used in the facility will be described as an example of the right for receiving a service in the actual facility. In other words, in the following embodiments, a user can exercise a right for receiving a service in the actual facility by using the electronic membership card. In the following embodiments, the electronic membership card may be denoted by an "electronic membership card". In addition, in the following embodiments, the facility in which various services are provided by a service provider will be described as a store.

1-2. Electronic Membership Card Issuing Process

Figure 2:
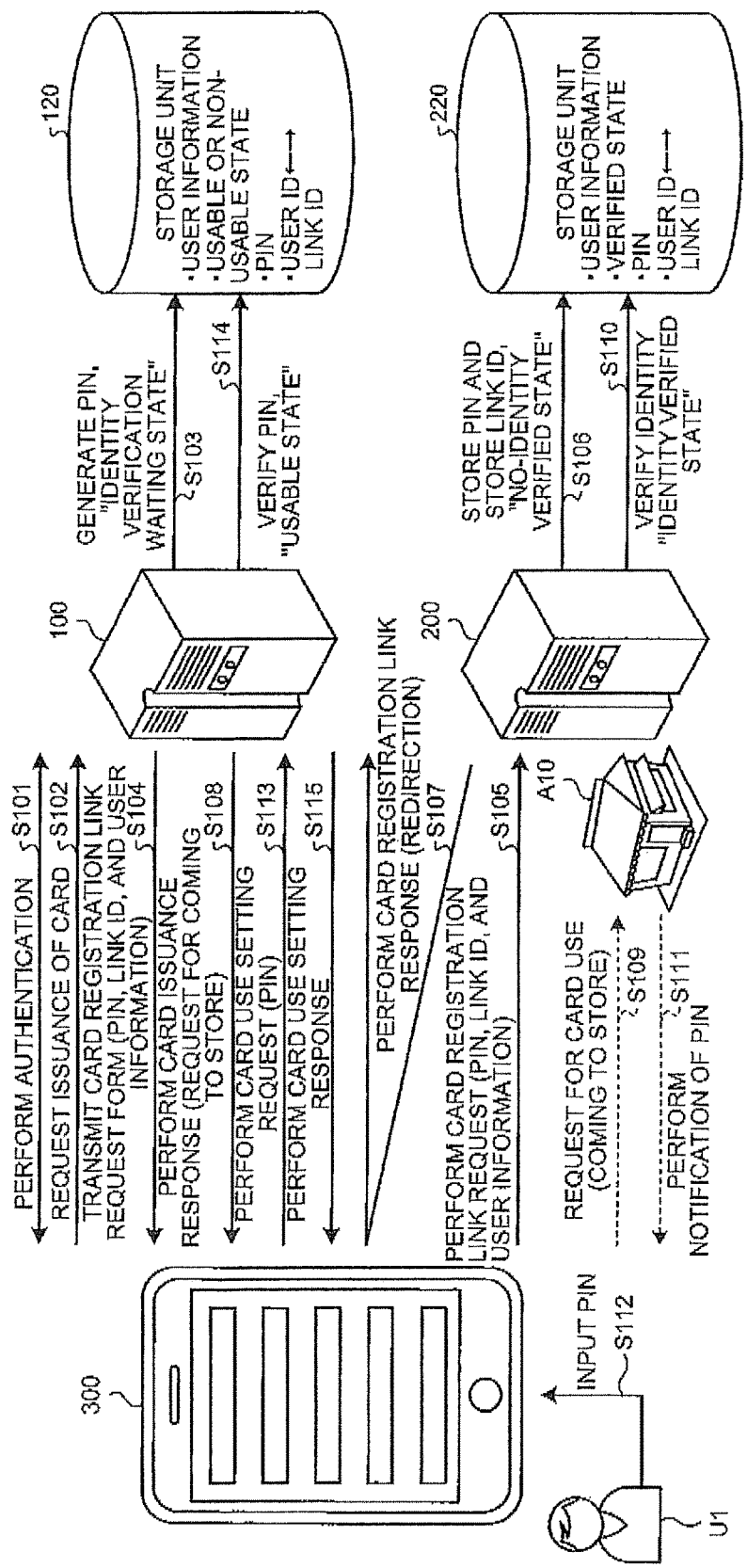
FIG. 2 is a diagram that illustrates an example of an electronic membership card issuing process according to the membership managing system according to the first embodiment.

FIG. 2 is a diagram that illustrates an example of an electronic membership card issuing process according to the membership managing system 1 according to the first embodiment. First, as a premise, in the example illustrated in FIG. 2, the service provider managing the service providing apparatus 200 is assumed to provide various services in a store A10. The store A10, for example, corresponds to a drug store, a rental shop for a music CD, a DVD, or the like, or an Internet café (including a Manga café).

In addition, in the store A10, a service for issuing an electronic membership card is assumed to be performed. The electronic membership card corresponds to image data stored in the terminal apparatus 300 such as a smartphone and may be regarded also as a virtual membership card. By displaying the electronic membership card in the whole terminal apparatus 300, the terminal apparatus 300 serves as a physical membership card. For example, while, generally, a barcode or the like printed on a membership card that is a physical medium is read in a store, by reading a barcode or the like displayed on the electronic membership card that is displayed in the whole terminal apparatus 300, a point is given or a music CD or the like is rent to a user holding the electronic membership card in the store A10. Here, in the store A10, an electronic membership card is issued only in a case where the identity is verified by user's presenting a document allowing for checking a person such as a driver's license or a student identification card. In other words, the store A10 has a security policy of issuing an electronic membership card only after verification of the identity.

In addition, in the terminal apparatus 300 illustrated in FIG. 2, an application (hereinafter, may also be referred to as a "card application") that is used by a user U1 and is used for managing electronic membership cards altogether is installed. The card application is provided by the user information managing side managing the user information managing apparatus 100. In addition, it is assumed that the user U1 has been registered in the user information managing apparatus 100 but has not been registered in the service providing apparatus 200. In other words, it is assumed that the user information managing apparatus 100 maintains information relating to the user U1, but the service providing apparatus 200 does not maintain the information relating to the user U1.

Furthermore, the user information managing apparatus 100 is in cooperation with the store A10 issuing the electronic membership card, performs a process of supporting the issuance of the electronic membership card, and manages various kinds of information relating to the electronic membership card. The user information managing apparatus 100 includes a storage unit 120. The storage unit 120 stores "user information" corresponding to the name, the date of birth, and the like of the user U1, a "usable or non-usable state" representing whether or not the use of the electronic membership card is permitted to the user U1, and the like. In addition, the service providing apparatus 200 includes a storage unit 220 storing the "user information" and a "verification state" representing whether or not the identity of the user U1 has been verified.

On such premises, the process of issuing an electronic membership card that can be used in the store A10 to the user U1 will be described with reference to FIG. 2. First, when accessed from the terminal apparatus 300, the user information managing apparatus 100 authenticates a user U1 in Step S101. For example, the user information managing apparatus 100 receives a user ID and a password from the terminal apparatus 300 and authenticates the user U1. Here, it is assumed that the user information managing apparatus 100 succeeds in the authentication of the user U1.

Subsequently, it is assumed that the user U1 starts the operation of the card application and performs an operation of requesting the issuance of an electronic membership card that can be used in the store A10. When such an operation is received, the terminal apparatus 300 transmits a card issuing request for requesting to issue an electronic membership card of the store A10 to the user information managing apparatus 100 in Step S102.

Subsequently, when the card issuing request is received from the terminal apparatus 300 succeeding in the authentication, the user information managing apparatus 100 issues a personal identification number (PIN) for identifying the card issuing request and stores the issued PIN in the storage unit 120 in Step S103. For example, the PIN may be an arbitrary number or a character string and may be an identifier that can be used for identifying at least the card issuing request received in Step S102.

In addition, the user information managing apparatus 100 associates the user ID of the user U1 with a predetermined link ID in Step S103. For example, the link ID may be an arbitrary number or a character string and may be an identifier that can be used for identifying at least the user U1. Furthermore, the user ID managed by the user information managing apparatus 100 is an identifier used for identifying the user U1 in the user information managing apparatus 100 and is not managed at least in the service providing apparatus 200.

In addition, the user information managing apparatus 100 updates the usable or non-usable state corresponding to the user U1 and the store A10 to a "identity verification waiting state" in Step S103. The "identity verification waiting state" represents a non-usable state in which the identity of the user U1 is not verified by the store A10, and the use of the electronic membership card is not permitted to the user U1.

Subsequently, the user information managing apparatus 100 transmits a card registration link request form including a PIN, a link ID, and user information (a name, and the like) to the terminal apparatus 300 in Step S104. This card registration link request form is an input screen used for inputting user information that is necessary when user registration is performed for the service providing apparatus 200, and user information maintained by the user information managing apparatus 100 is displayed therein in advance. When such a card registration link request form is received, the terminal apparatus 300 displays the input screen on which the user information is displayed in advance, thereby allowing the user U1 to edit the user information. From this, the user U1 may input user information in the form of changing, adding, or the like of the user information transmitted from the user information managing apparatus 100. In a case where the changing, the adding, or the like of the user information is not necessary, the user U1 may complete the input of the user information without editing the user information. Then, when an operation of completing the input of the user information is performed, the terminal apparatus 300 transmits a card registration link request including the input user information, the PIN, and the link ID to the service providing apparatus 200 in Step S105.

When the card registration link request is received from the terminal apparatus 300, the service providing apparatus 200 stores the user information included in the card registration link request in the storage unit 220 and performs user registration of the user U1 using the user information. At this time, the service providing apparatus 200 may provide the user ID, and the password for the terminal apparatus 300. In addition, at this time point, the user U1 is only registered in the service providing apparatus 200, and the user U1 cannot use the electronic membership card that can be used in the store A10.

In addition, the service providing apparatus 200 stores the PIN included in the card registration link request in the storage unit 220 in step S106. Furthermore, the service providing apparatus 200 associates the user ID of the user U1 with the link ID included in the card registration link request in Step S106. The user ID managed by the service providing apparatus 200 is an identifier used for identifying the user U1 in the service providing apparatus 200 and is not managed at least in the user information managing apparatus 100. In addition, the service providing apparatus 200 updates the verification state corresponding to the user 1/ to the "no-identity verified state" in Step S106.

Subsequently, the service providing apparatus 200 transmits a card registration link response as a response to the card registration link request to the user information managing apparatus 100 through the terminal apparatus 300 in Step S107. For example, by being redirected using the card application installed to the terminal apparatus 300, the card registration link response is transmitted to the user information managing apparatus 100.

When the card registration link response is received, the user information managing apparatus 100 transmits a card issuance response as a response to the card issuing request received in Step S102 to the terminal apparatus 300 in Step S108. Such a card issuance response notifies the user U1 of requesting to come to the store A10 for identity verification. The terminal apparatus 300 that has received such a card issuance response displays information requesting the user to come to the store A10. From this, the terminal apparatus 300 can notify the user of identity verification waiting, thereby urging the user to come to the store. In addition, at this time point, while the terminal apparatus 300 receives the card issuance response, the user U1 cannot use the electronic membership card of the store A10.

Thereafter, the user U1 comes to the store A10 and requests (card use request) the service provider (a clerk or the like) to enable the use of the electronic membership card in Step S109. In such a case, the service provider of the store A10 performs identity verification of the user UT by allowing the user U1 to present a driver's license or the like and comparing personal information written in the driver's license or the like and the user information stored in the storage unit 220 in Step S110. In addition, the service provider checks whether or not the user U1 satisfies the requirements (security policy) of a user who can be registered as a member in Step S110. For example, the service provider checks whether or not the age and the sex of the user U1 satisfy the security policy of the store A10. In a case where the user U1 satisfies the security policy, and it is checked that the user U1 is the person himself, the service provider inputs information representing an indication thereof to the service providing apparatus 200. From this, the service providing apparatus 200 updates the verified state of the storage unit 220 to an "identity verified state" in Step 110. In addition, in a case where the identity is verified, the service provider transmits the PIN stored in the storage unit 220 to the user U1 in a verbal manner or the like in Step S111.

Thereafter, the user U1 inputs the PIN, which has been notified of from the store A10, to the card application in Step S112. From this, the terminal apparatus 300 transmits a card use setting request including the PIN input by the user U1 to the user information managing apparatus 100 in Step S113.

The user information managing apparatus 100 verifies whether or not the PIN included in the card use setting request received from the terminal apparatus 300 and the PIN stored in the storage unit 120 match each other. In a case where the PINs match each other, the user information managing apparatus 100 updates the usable or non-usable state of the storage unit 120 to a "usable state" in Step S114.

Subsequently, the user information managing apparatus 100 transmits a card use setting response used for notifying the usability of the electronic membership card to the terminal apparatus 300 in Step S115. Then, when the card use setting response is received, the terminal apparatus 300 sets the electronic membership card corresponding to the store A10 to be in a usable state under the control of the card application.

As above, in the membership managing system 1 according to the first embodiment, even in a case where the card issuing request is received by the user information managing apparatus 100 from the terminal apparatus 300, the user of the electronic membership card is not permitted to be used unless identity verification of the user U1 is made in the store A10. From this, the service provider of the store A10 can also check whether or not the requirements for a user who can be registered as a member are satisfied at the time of identity verification. In other words, in the membership managing system 1 according to the first embodiment, an electronic membership card corresponding to the requirements (security policy) of membership registration set for each store can be issued.

In addition, in the membership managing system 1 according to the first embodiment, user IDs that are individually managed by the user information managing apparatus 100 and the service providing apparatus 200 can be associated with each other by using the link ID. From this, the service providing apparatus 200 can deliver an advertisement to the terminal apparatus 300 through the user information managing apparatus 100. For example, the service providing apparatus 200 can request the user information managing apparatus 100 to deliver an advertisement to the user who is a member of the store thereof by notifying the user information managing apparatus 100 of the link ID or the like. In such a case, the user information managing apparatus 100 that has received a request from the service providing apparatus 200 can deliver an advertisement to the terminal apparatus 300, for example, based on information (membership registration statuses in other stores, a web page browsing history, a search history in a search engine, or the like) relating to the user. In addition, for example, the service providing apparatus 200 may acquire information (membership registration statuses in other stores, a web page browsing history, a search history in a search engine, or the like) relating to the user from the user information managing apparatus 100. In such a case, the service provider may recommend a product to the user U1 visiting the store A10 using the information acquired from the user information managing apparatus 100.

Furthermore, as described above, according to the terminal apparatus 300, a plurality of electronic membership cards can be managed together by using the card application. Although not described with reference to FIG. 2, the terminal apparatus 300 transmits a card issuing request including a card ID that may be used for identifying an electronic membership card so as to be able to specify the electronic membership card that is a target for the issuing request. For the same reason, card IDs may be included in the registration link request form, the card registration link request, the card registration link response, the card issuance response, the card use setting request, and the card use setting response illustrated in FIG. 2. Hereinafter, it is assumed that card IDs are included in such various requests and various responses in the description.

1-3. Configuration of User Information Managing Apparatus

Figures 3, 4:
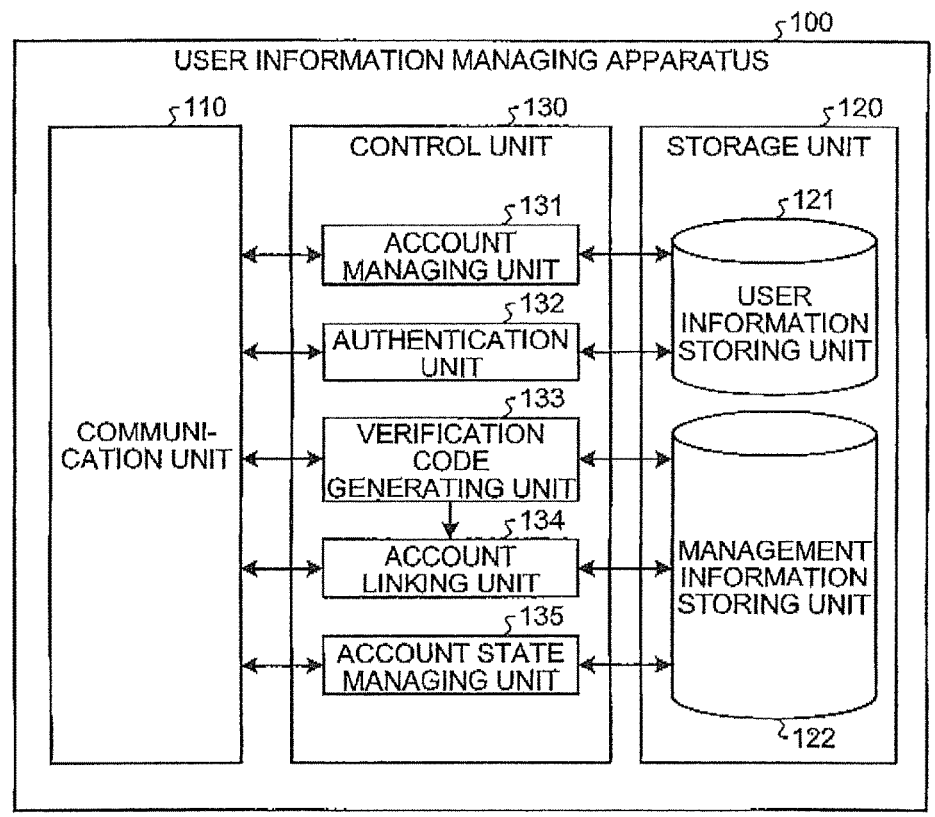
FIG. 3 is a diagram that illustrates an example of the configuration of a user information managing apparatus according to the first embodiment.
FIG. 4 is a diagram that illustrates an example of a user information storing unit according to the first embodiment.

Next, the configuration of the user information managing apparatus 100 according to the first embodiment will be described with reference to FIG. 3. As illustrated in FIG. 3, the user information managing apparatus 100 according to the first embodiment includes a communication unit 110, a storage unit 120, and a control unit 130. In addition, the user information managing apparatus 100 may include an input unit (for example, a keyboard, a mouse, or the like) receiving various operations from a supervisor of the user information managing apparatus 100 or anyone else and a display unit (a liquid crystal display or the like) used for displaying various kinds of information.

1-3(1). Communication Unit 110

The communication unit 110, for example, is implemented by a network interface card (NIC) or the like. The communication unit 110 is connected to a network through a wired or wireless manner and transmits or receives information to or from the terminal apparatus 300 through the network.

1-3(2). Storage Unit 120

The storage unit 120, for example, is implemented by a semiconductor memory device such as a random access memory (RAM) or a flash memory or a storage device such as a hard disk or an optical disc. The storage unit 120 according to the first embodiment, as illustrated in FIG. 3, includes a user information storing unit 121 and a management information storing unit 122.

1-3(3). User Information Storing Unit 121

The user information storing unit 121 stores various kinds of information relating to users that are registered in the user information managing apparatus 100 as users. Here, FIG. 4 illustrates an example of the user information storing unit 121 according to the first embodiment. In the example illustrated in FIG. 4, the user information storing unit 121 includes items of "management-side user ID", "password", "name", and "date of birth".

The "management-side user ID" represents an identifier used for identifying a user in the user information managing apparatus 100. The "password" represents a password assigned to the user. The "name" represents a name of the user. The "date of birth" represents the date of birth of the user.

FIG. 4 illustrates an example in which the password of a user identified by a management-side user ID "U01" is "P01", the name is "AAA", and the date of birth is "Mar. 10, 1985".

The user information is not limited to the example illustrated in FIG. 4, but the user information storing unit 121 may store various kinds of user information. For example, the user information storing unit 121 may store an address, a phone number, an electronic mail address, an occupation, an office address, an office telephone number, and the like of the user.

1-3(4). Management Information Storing Unit 122

The management information storing unit 122 stores various kinds of information relating to an electronic membership card used by a user or an electronic membership card requested to be used by a user for each user. Here, FIG. 5 illustrates an example of the management information storing unit 122 according to the first embodiment. In the example illustrated in FIG. 5, the management information storing unit 122 includes items of "management-side user ID", "link ID", "card ID", "PIN", "usable or non-usable state", and "date and time of identity verification".

The "management-side user ID" corresponds to the management-side user ID illustrated in FIG. 4. The "link ID" represents an identifier used for associating the management-side user ID and a user ID (a "providing-side user ID" to be described later) managed by the service providing apparatus 200 with each other. In the first embodiment, a link ID is assumed to be assigned to each management-side user ID. The "card ID" represents an identifier used for identifying an electronic membership card. The "PIN" represents an identifier used for identifying the card issuing request illustrated in FIG. 2 and is information that is unique to a combination of the management-side user ID and the card ID. The "usable or non-usable state" represents whether or not the use of the electronic membership card is permitted to the user. According to the first embodiment, in the "usable or non-usable state" of the management information storing unit 122, an "identity verification waiting state" representing a state in which the use of the electronic membership card is not permitted or a "usable state" representing a state in which the use of the electronic membership card is permitted is stored. The "identity verification date and time" represent the date and time at which the identity of the user is verified in a facility such as a store.

FIG. 5 illustrates an example in which the link ID of a user (user U1) identified by the management-side user ID "U01" is "L01". In addition, FIG. 5 illustrates an example in which the use of an electronic membership card identified by a card ID "C11" and an electronic membership card identified by a card ID "C12" is not permitted to the user U1, but the use of an electronic membership card identified by a card ID "C13" is permitted to the user U1. Furthermore, FIG. 5 illustrates the example in which the identity of the user U1 is verified at "10:40 on Nov. 1, 2012" in a store issuing the electronic membership card identified by the card ID "C13".

In addition, when a user is registered in the user information managing apparatus 100, the management-side user ID is stored in the management information storing unit 122. Thereafter, when a user requests the issuance of an electronic membership card, the management information storing unit 122 stores other items (the card ID and the like) other than the management-side user ID. However, the management information storing unit 122 is not limited to this example but may store the management-side user ID and the link ID at a time point when the user is registered in the user information managing apparatus 100. In addition, the management information storing unit 122 may store card IDs of all the electronic membership cards issued by stores that are in cooperation with the user information managing apparatus 100 at a time point when the user is registered in the user information managing apparatus 100.

1-3(5). Control Unit 130

Referring back to FIG. 3, the control unit 130 is implemented by executing a program (corresponding to an example of the membership managing program) stored in an internal storage device (the storage unit 120 or the like), for example, by using a central processing unit (CPU), a micro processing unit (MPU), or the like with the RAM used as a work area. In addition, the control unit 130, for example, is implemented by an integrated circuit such as an application specific integrated circuit (ASIC) or a field programmable gate array (FPGA).

Such a control unit 130, as illustrated in FIG. 3, includes an account managing unit 131, an authentication unit 132, a verification code generating unit 133, an account linking unit 134, and an account state managing unit 135 and realizes or performs functions and actions of information processing to be described later. However, the internal configuration of the control unit 130 is not limited to the configuration illustrated in FIG. 3, and any other configuration may be employed as long as the information processing to be described later can be performed.

1-3(6). Account Managing Unit 131

The account managing unit 131 manages accounts of users of the user information managing apparatus 100. The account managing unit 131 according to the first embodiment uses a management-side user ID and a password as an account of a user registered in the user information managing apparatus 100. In addition, the account managing unit 131 manages user information such as a name, date of birth, and the like in the user information storing unit 121 as information relating to the account.

In addition, when a user registration request is received, for example, from the terminal apparatus 300, the account managing unit 131 transmits an input screen used for inputting user information such as the name, the date of birth, and the like to the terminal apparatus 300 and stores the user information input to the input screen in the user information storing unit 121, thereby performing user registration. Furthermore, the account managing unit 131 updates the user information stored in the user information storing unit 121, for example, in accordance with a request from the terminal apparatus 300.

1-3(7). Authentication Unit 132

When an authentication request is received from the terminal apparatus 300 that is registered in the user information managing apparatus 100 as a user, the authentication unit 132 authenticates the user of the terminal apparatus 300. For example, when being accessed from the terminal apparatus 300, the authentication unit 132 transmits a login screen to the terminal apparatus 300. Then, the authentication unit 132 determines whether or not a combination of the management-side user ID and the password that matches a combination of the user ID and the password input to the login screen is stored in the user information storing unit 121. Then, in a case where the combination is stored in the user information storing unit 121, the authentication unit 132 determines a verification success. On the other hand, in a case where the combination is not stored in the user information storing unit 121, the authentication unit 132 determines a verification failure. Here, the user for whom a verification success has not been determined by the authentication unit 132 cannot receive the electronic membership card issuing service described with reference to FIG. 2. From this, the authentication unit 132 can improve the security of the electronic membership card issuing service provided by the membership managing system 1.

1-3(8). Verification Code Generating Unit 133

The verification code generating unit 133 generates an identity verification code used for checking whether or not the identity verification of a user has been made. More specifically, when a card issuing request is received from the terminal apparatus 300 for which a verification success has been determined by the authentication unit 132, the verification code generating unit 133 according to the first embodiment generates a PIN as an identity verification code and stores the generated PIN in the management information storing unit 122 (corresponding to Step S103 illustrated in FIG. 2).

As described above, although description has not been presented with reference to FIG. 2, the terminal apparatus 300 transmits the card issuing request including a card ID to the user information managing apparatus 100. Accordingly, the verification code generating unit 133 stores the PIN in the management information storing unit 122 in association with the management-side user ID of a user that is a transmission source of the card issuing request and the card ID included in the card issuing request.

For example, it is assumed that a terminal apparatus 300 of a user having a management-side user ID of "U01"

transmits a card issuing request including a card ID "C11". At this time, the verification code generating unit 133 is assumed to generate a PIN "V11". In such a case, the verification code generating unit 133, as in the example illustrated in FIG. 5, stores the PIN "V11" in the management information storing unit 122 in association with the management-side user ID "U01" and the card ID "C11".

Here, by receiving the card issuing request including a management-side user ID from the terminal apparatus 300, the verification code generating unit 133 can specify the management-side user ID of the terminal apparatus 300. Here, the method of specifying a management-side user ID is not limited to that illustrated in this example, and the verification code generating unit 133 may specify the management-side user ID of the terminal apparatus 300 based on a user identifier set using an HTTP cookie that is transmitted or received to or from the terminal apparatus 300 or the like. In the account linking unit 134 and the account state managing unit 135 to be described below, a management-side user ID is specified by receiving the management-side user ID from the terminal apparatus 300 or based on an HTTP cookie or the like.

1-3(9). Account Linking Unit 134

The account linking unit 134 cooperates with the service providing apparatus 200, thereby linking a user's account in the user information managing apparatus 100 and a user's account in the service providing apparatus 200 with each other. The account linking unit 134 according to the first embodiment associates the management-side user ID managed in the user information managing apparatus 100 and the user ID (the "providing-side user ID" to be described later) managed in the service providing apparatus 200 with each other.

More specifically, when a card issuing request is received from the terminal apparatus 300 for which a verification success has been determined by the authentication unit 132, the account linking unit 134 stores the card ID included in the card issuing request in the management information storing unit 122 in association with the management-side user ID of the terminal apparatus 300 and stores the "identity verification waiting state" in the usable or non-usable state corresponding to the card ID. Subsequently, the account linking unit 134 acquires a link ID corresponding to the management-side user ID of the terminal apparatus 300 from the management information storing unit 122. At this time, in a case where a link ID is not stored in the management information storing unit 122, the account linking unit 134 newly generates a link ID and stores the generated link ID in the management information storing unit 122 in association with the management-side user ID of the terminal apparatus 300.

Then, the account linking unit 134 transmits a card registration link request form including the PIN generated by the verification code generating unit 133, the link ID stored in the management information storing unit 122 in association with the management-side user ID of the transmission source (terminal apparatus 300) of the card issuing request, the user information (the name and the like) stored in the user information storing unit 121 in association with the management-side user ID, and the card ID of the electronic membership card that is the issuing request target to the terminal apparatus 300 (corresponding to Step S104 illustrated in FIG. 2). The card registration link request form transmitted by the account linking unit 134 is transmitted from the terminal apparatus 300 to the service providing apparatus 200 as a card registration link request (corresponding to Step S105 illustrated in FIG. 2). In other words, the account linking unit 134 transmits a card registration link request to the service providing apparatus 200 through the terminal apparatus 300. From this, the account linking unit 134 links a link ID with the user ID (the "providing-side user ID" to be described later), which is used for identifying a user in the service providing apparatus 200, for the service providing apparatus 200.

In addition, when a card registration link response is received from the service providing apparatus 200, the account linking unit 134 transmits a card issuance response used for notifying a user of a request for coming to the store to the terminal apparatus 300 (corresponding to Step S108 illustrated in FIG. 2). At this time, the account linking unit 134 transmits a card issuance response including the card ID included in the card registration link response.

1-3(10). Account State Managing Unit 135

The account state managing unit 135 manages whether to permit the use of the electronic membership card to the user. More specifically, when a card use setting request is received from the terminal apparatus 300, the account state managing unit 135 acquires the PIN stored in the management information storing unit 122 in association with a combination of the card ID included in the card use setting request and the management-side user ID of the terminal apparatus 300. Subsequently, the account state managing unit 135 verifies whether or not the PIN acquired from the management information storing unit 122 and the PIN included in the card use setting request match each other. Then, when both PINs match each other, the account state managing unit 135 determines that the identity of the user of the terminal apparatus 300 is verified in the store and updates the usable or non-usable state of the management information storing unit 122 corresponding to the management-side user ID of the terminal apparatus 300 to the "usable state" (corresponding to Step S114 illustrated in FIG. 2). Then, the account state managing unit 135 transmits a card use setting response representing that the electronic membership card can be used to the terminal apparatus 300 (corresponding to Step S115 illustrated in FIG. 2). Such a card use setting response corresponds to a change notification for notifying that the user permission state is changed to the usable state. From this, the card application of the terminal apparatus 300 sets the electronic membership card requested in the card issuing request to be in the usable state.

In addition, when the usable or non-usable state is updated, the account state managing unit 135 stores the date and time at which the card use setting request is received in the identity verification date and time of the management information storing unit 122. However, the setting of the identity verification date and time is not limited to this example, and the account state managing unit 135 may receive a card use setting request including identity verification date and time. In such a case, the account state managing unit 135 stores such identity verification date and time in the management information storing unit 122.

1-4. Configuration of Service Providing Apparatus

Next, the configuration of the service providing apparatus 200 according to the first embodiment will be described with reference to FIG. 6. As illustrated in FIG. 6, the service providing apparatus 200 according to the first embodiment includes a communication unit 210, a storage unit 220, and a control unit 230. In addition, the service providing apparatus 200 may include an input unit (for example, a keyboard, a mouse, or the like) receiving various operations from a service provider and a display unit (a liquid crystal display or the like) used for displaying various kinds of information.

1-4(1). Communication Unit 210

The communication unit 210, for example, is implemented by an NIC or the like. The communication unit 210 is connected to a network through a wired or wireless manner and transmits or receives information to or from the terminal apparatus 300 through the network.

1-4(2). Storage Unit 220

The storage unit 220, for example, is implemented by a semiconductor memory device such as a RAM or a flash memory or a storage device such as a hard disk or an optical disc. The storage unit 220 according to the first embodiment, as illustrated in FIG. 6, includes a user information storing unit 221, a management information storing unit 222, and a requirement storing unit 223.

1-4(3). User Information Storing Unit 221

The user information storing unit 221 stores various kinds of information relating to users that are registered in the service providing apparatus 200 as users. Here, FIG. 7 illustrates an example of the user information storing unit 221 according to the first embodiment. In the example illustrated in FIG. 7, the user information storing unit 221 includes items of "providing-side user ID", "password", "providing services", "name", and "date of birth".

The "providing-side user ID" represents an identifier used for identifying a user in the service providing apparatus 200. The "password" represents a password assigned to the user. The "providing services" represent services that are targets to be provided for the user by the service providing apparatus 200. The "name" represents a name of the user. The "date of birth" represents the date of birth of the user.

FIG. 7 illustrates an example in which the password of a user (user U2) identified by a providing-side user ID "S02" is "P12", the name is "BBB", and the date of birth is "Apr. 16, 1977". In addition, FIG. 7 illustrates an example in which the services provided from the service provider for the user U2 are a "Web service" and a "point service". Here, the "Web service" is a service for enabling an access to a member-dedicated home page or the like provided by the service providing apparatus 200, and the "point service" is a service that user V2 can receive at the store.

The user information storing unit 221 is not limited to the example illustrated in FIG. 7, but may store various kinds of user information. For example, the user information storing unit 221 may store an address, a phone number, an electronic mail address, an occupation, an office address, an office telephone number, and the like of the user.

1-4(4). Management Information Storing Unit 222

The management information storing unit 222 stores various kinds of information relating to an electronic membership card used by a user or an electronic membership card requested to be used by a user for each user. Here, FIG. 8 illustrates an example of the management information storing unit 222 according to the first embodiment. In the example illustrated in FIG. 8, the management information storing unit 222 includes items of "providing-side user ID", "link ID", "PIN", and "verification state".

The "providing-side user ID" corresponds to the providing-side user ID illustrated in FIG. 7. The "link ID" represents an identifier used for associating the providing-side user ID and the management-side user ID managed by the user information managing apparatus 100 with each other. The "PIN" corresponds to the PIN represented in FIG. 5. The "verification state" represents whether or not the identity is verified. According to the first embodiment, in the "verification state" of the management information storing unit 222, a "non-identity verified state" representing a state in which the identity of a user has not been verified or an "identity verified state" representing a state in which the identity of a user has been verified is stored.

FIG. 8 illustrates an example in which a user link ID identified by a providing-side user ID "S01" is "L01", and the use of the electronic membership card issued by a service provider of the service providing apparatus 200 is not permitted to the user. In addition, an example is illustrated in which the use of the electronic membership card issued by the service provider of the service providing apparatus 200 is permitted to a user identified by a providing-side user ID "S02".

In addition, in the first embodiment, it is assumed that one type of electronic membership card is issued from one store, and the service providing apparatus 200 corresponding to each store maintains a card ID of the electronic membership card issued in a store corresponding to the service providing apparatus 200 in advance. Accordingly, the management information storing unit 222 illustrated in FIG. 8 does not store the card ID. However, in a case where a plurality of types of electronic membership cards are issued from one store, the management information storing unit 222 stores a PIN and a verification state for each providing-side user ID and each card ID.

In addition, it is assumed that both user IDs in which the last two digits of the management-side user ID represented in FIG. 5 and the last two digits of the providing-side user ID represented in FIG. 8 match each other are assigned to the same user. For example, a management-side user ID "U01" and a providing-side user ID "S01" are assigned to the same user. As above, the user information managing apparatus 100 and the service providing apparatus 200 identify a user by using mutually-different IDs. However, as illustrated in FIGS. 5 and 8, the same link ID is associated with a management-side user ID and a providing-side user ID which are assigned to the same user.

1-4(5). Requirement Storing Unit 223

The requirement storing unit 223 stores user requirements (conditions and limits) for users who are registered in the service providing apparatus 200 as members and are permitted to use electronic membership cards. In other words, the requirement storing unit 223 stores requirements for users who can use electronic membership cards as a security policy. Here, FIG. 9 illustrates an example of the requirement storing unit 223 according to the first embodiment. In the example illustrated in FIG. 9, the requirement storing unit 223 includes items of "age" and "sex".

The "age" represents the age requirement for users who are registered in the service providing apparatus 200 as members and are permitted to use electronic membership cards. The "sex" represents the sex requirement for users who are registered in the service providing apparatus 200 as members and are permitted to use electronic membership cards.

In FIG. 9, it is represented that users who can be registered in the service providing apparatus 200 as members are "over 18 years old". FIG. 9 illustrates an example in which a user can be registered in the service providing apparatus 200 as a member regardless of the sex.

The requirement storing unit 223 is not limited to the example illustrated in FIG. 9 but may store various requirements. For example, the requirement storing unit 223 may store a birthplace, a family structure, an occupation, a type of workplace, and the like. In addition, the requirement storing unit 223 may store a plurality of records. For example, the requirement storing unit 223 may store a requirement representing that only a male over 15 years old can be registered as a member and a requirement representing that a person over 18 years old can be registered as a member regardless of sex.

1-4(6). Control Unit 230

Referring back to FIG. 6, the control unit 230 is implemented by executing a program stored in an internal storage device (the storage unit 220 or the like), for example, by using a CPU, an MPU, or the like with the RAM used as a work area. In addition, the control unit 230, for example, is implemented by an integrated circuit such as an ASIC or an FPGA.

Such a control unit 230, as illustrated in FIG. 6, includes a service providing unit 231, an account managing unit 232, a verification code managing unit 233, an account linking unit 234, an identity verification unit 235, and an account state managing unit 236 and realizes or performs functions and actions of information processing to be described later. However, the internal configuration of the control unit 230 is not limited to the configuration illustrated in FIG. 6, and any other configuration may be employed as long as the information processing to be described later can be performed.

1-4(7). Service Providing Unit 231

The service providing unit 231 provides various services for a user of the terminal apparatus 300. More specifically, the service providing unit 231 provides a providing service stored in the user information storing unit 221 for the user. For example, in a case where the user information storing unit 221 is in a state illustrated in FIG. 7, while the service providing unit 231 provides a Web service for a user having a providing-side user ID "S01", the service providing unit 231 provides a point service and a Web service for a user having a providing-side user ID "S02".

1-4(8). Account Managing Unit 232

The account managing unit 232 manages accounts of users in the service providing apparatus 200. The account managing unit 232 according to the first embodiment uses a providing-side user ID and a password as an account of a user registered in the service providing apparatus 200. In addition, the account managing unit 232 manages user information such as a name and a date of birth in the user information storing unit 221 as information relating to accounts.

More specifically, when a card registration link request is received from the terminal apparatus 300, the account managing unit 232 determines whether or not the generation of the account of a user of the terminal apparatus 300 has been completed by referring to the user information storing unit 221. For example, when a card registration link request including a providing-side user ID is received, the account managing unit 232 determines that the generation of the account has been completed. On the other hand, when a card registration link request not including a providing-side user ID is received, the account managing unit 232 determines that the account has not been generated. Then, in a case where the generation of the account has been completed, the account managing unit 232 stores user information included in the card registration link request in the user information storing unit 221 in association with the account and stores the providing-side user ID in the management information storing unit 222. In addition, the account managing unit 232 stores the "non-identity verified state" in the verification state of the management information storing unit 222 as the initial state. On the other hand, in a case where the account has not been generated, the account managing unit 232 generates an account (at least, a providing-side user ID) and stores the user information included in the card registration link request in the user information storing unit 221 in association with the generated account.

1-4(9). Verification Code Managing Unit 233

The verification code managing unit 233 manages the identity verification codes generated by the verification code generating unit 133 of the user information managing apparatus 100. More specifically, when a card registration link request is received from the terminal apparatus 300, the verification code managing unit 233 stores the PIN included in the card registration link request in the management information storing unit 222 in association with the providing-side user ID of the terminal apparatus 300. In addition, the verification code managing unit 233 stores the PIN in the management information storing unit 222 in association with the providing-side user ID generated by the account managing unit 232 or the providing-side user ID included in the card registration link request.

1-4(10). Account Linking Unit 234

The account linking unit 234 cooperates with the user information managing apparatus 100, thereby linking a user's account in the user information managing apparatus 100 and a user's account in the service providing apparatus 200 with each other. The account linking unit 234 according to the first embodiment associates the management-side user ID managed in the user information managing apparatus 100 and the providing-side user ID managed in the service providing apparatus 200 with each other.

More specifically, when a card registration link request including a PIN, a link ID, and user information (a name and the like) is received from the terminal apparatus 300, the account linking unit 234 stores the link ID included in the card registration link request in the management information storing unit 222 in association with the providing-side user ID of the terminal apparatus 300 (corresponding to Step S106 illustrated in FIG. 2). Then, after associating the link ID with the providing-side user ID, the account linking unit 234 transmits a card registration link response as a response to the card registration link request to the user information managing apparatus 100 through the terminal apparatus 300 (corresponding to Step S107 illustrated in FIG. 2). At this time, the account linking unit 234 transmits a card registration link response including the card ID of the electronic membership card issued in a store corresponding to the service providing apparatus 200.

1-4(11). Identity Verification Unit 235

In a case where a user coming to the store is the person himself, the identity verification unit 235 displays a PIN corresponding to the user on a predetermined display unit (a store terminal installed inside the store or the like). For example, the identity verification unit 235 displays the user information stored in the user information storing unit 221 or the requirement information stored in the requirement storing unit 223 on the display unit in accordance with an operation of the service provider. From this, the service provider checks whether or not the user is the person himself and the user satisfies the requirement information by comparing personal information written in a document, which can be used for verifying the identity, such as a driver's license presented by the user coming to the store and the user information displayed on the display unit through visual observation. Then, in a case where an input indicating that the requirement information is satisfied and the user is the person himself is made by the service provider, the identity verification unit 235 acquires a PIN corresponding to the providing-side user ID of the user coming to the store from the management information storing unit 222 and displays the PIN on the display unit. From this, the service provider notifies the user of the PIN displayed on the display unit in a verbal manner or the like (corresponding to Step S111 illustrated in FIG. 2).

In the above-described example, while an example is illustrated in which the identity is verified by a clerk through visual observation, the identity verification is not limited thereto. More specifically, the identity verification unit 235 may have a function for reading an integrated circuit (IC) card in which the personal information of the user is stored. In such a case, the identity verification unit 235 reads personal information from the IC card presented by the user and determines whether the user is the person himself based on whether the read personal information and the user information stored in the user information storing unit 221 match each other. In addition, by comparing the personal information read from the IC card and the requirement information stored in the requirement storing unit 223 with each other, the identity verification unit 235 determines whether or not the user satisfies the requirement information. Then, in a case where the user coming to the store is determined to be the person himself satisfying the requirement information, the identity verification unit 235 displays a PIN stored in the management information storing unit 222 in association with the providing-side user ID of the user on the display unit.

1-4(12). Account State Managing Unit 236

The account state managing unit 236 manages whether or not the identity of a user requesting the issuance of an electronic membership card has been verified. More specifically, in a case where the identity has been verified by the identity verification unit 235, the account state managing unit 236 updates the verification state of the management information storing unit 222 to the "identity verified state" (corresponding to Step S110 illustrated in FIG. 2).

1-5. Configuration of Terminal Apparatus

Figures 10, 11:
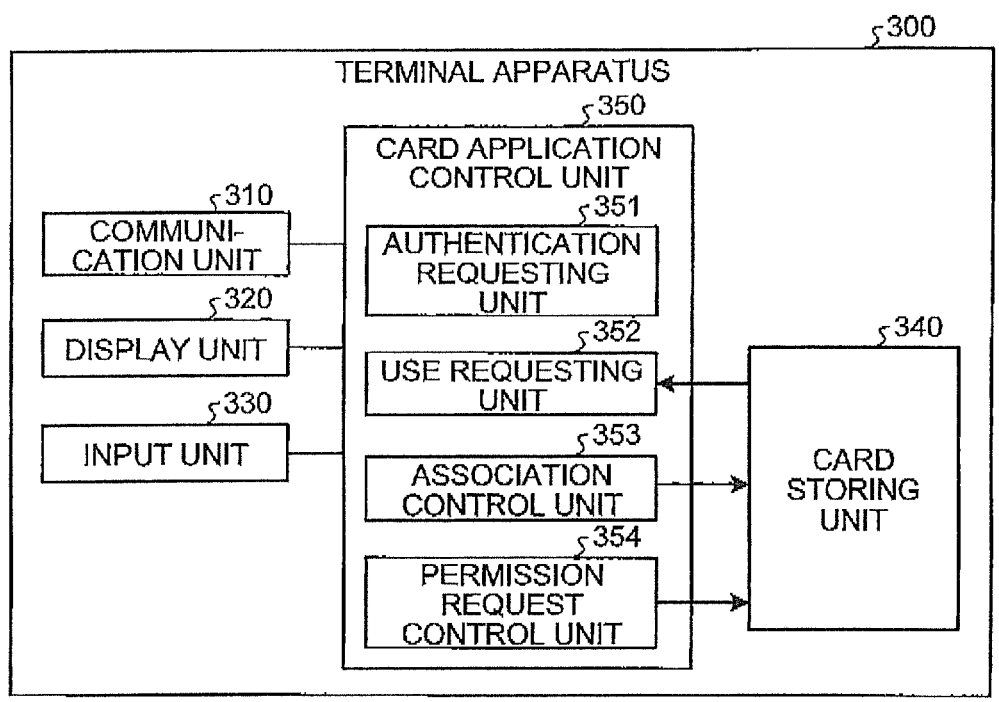
FIG. 10 is a diagram that illustrates an example of the configuration of a terminal apparatus according to the first embodiment.
FIG. 11 is a diagram that illustrates an example of a card storing unit according to the first embodiment.

Next, the configuration of the terminal apparatus 300 according to the first embodiment will be described with reference to FIG. 10. As illustrated in FIG. 10, the terminal apparatus 300 according to the first embodiment includes a communication unit 310, a display unit 320, an input unit 330, a card storing unit 340, and a card application control unit 350.

1-5(1). Communication Unit 310

The communication unit 310 transmits and receives information to and from the user information managing apparatus 100 or the service providing apparatus 200 through a network. In a case where the terminal apparatus 300 is a mobile terminal, the communication unit 310 makes a connection with the network in a wireless manner.

1-5(2). Display Unit 320 and Input Unit 330

The display unit 320 is a display device used for displaying various kinds of information. For example, the display unit 320 is implemented by a liquid crystal display or the like. The input unit 330 is an input device that receives various operations from a user. For example, the input unit 330 is implemented by cursor keys, numeric keys, and the like. In a case where a touch panel is employed in the terminal apparatus 300, the display unit 320 and the input unit 330 are integrated together.

1-5(3). Card Storing Unit 340

The card storing unit 340, for example, is implemented by a semiconductor memory device such as a RAM or a flash memory or a storage device such as a hard disk or an optical disc. The card storing unit 340 stores various kinds of information relating to electronic membership cards managed by the card application. Here, FIG. 11 illustrates an example of the card storing unit 340 according to the first embodiment. In the example illustrated in FIG. 11, the card storing unit 340 includes items of "card ID", "barcode", and "state information".

The "card ID" corresponds to the card ID illustrated in FIG. 5. The "barcode" is a code represented on an electronic membership card. Here, the "barcode" may be either a one-dimensional code or a two-dimensional code. The "state information" represents whether or not the use of the electronic membership card is permitted to a user. According to the first embodiment, in the "state information", an "identity verification waiting state" in which the use of the electronic membership card is not permitted, a "store-visiting requested state" in which a user is requested to come to the store, or a "usable state" in which the use of the electronic membership card is permitted is stored.

FIG. 11 illustrates an example in which the barcode of an electronic membership card identified by a card ID "C11" is "B11", the PIN is "V11", and the use of the electronic membership card is not permitted. FIG. 11 illustrates an example in which the use of an electronic membership card identified by a card ID "C12" is permitted after the identity of the user is verified. In addition, FIG. 11 illustrates an example in which the use of an electronic membership card identified by a card ID "C13" is permitted.

The card storing unit 340 may store not only information relating to an electronic membership card that can be used by a user and an electronic membership card that is during an issuance request but also information relating to an electronic membership card that can be issued by a store that is in cooperation with the user information managing apparatus 100. In such a case, the card storing unit 340, for example, stores a "no-request state" in the state information corresponding to an electronic membership card that is not during an issuance request.

In addition, several timings when the above-described "barcode" is issued may be considered. For example, after the card application is supplied to the terminal apparatus 300, the user information managing apparatus 100 may deliver a card ID and a barcode of an electronic membership card that is a candidate for a target for the issuance request to the terminal apparatus 300 by communicating with the terminal apparatus 300. In addition, the user information managing apparatus 100 may provide a card application in which a card ID and a barcode designated by a service provider (service providing apparatus 200) are included in advance. Furthermore, for example, after the use is permitted, the user information managing apparatus 100 or the service providing-apparatus 200 may transmit a barcode to the terminal apparatus 300. In addition, for example, after the terminal apparatus 300 transmits a card issuing request (the timing of one of Steps S102 to S115 illustrated in FIG. 2), the user information managing apparatus 100 or the service providing apparatus 200 may transmit a barcode to the terminal apparatus 300.

1-5(4). Card Application Control Unit 350

The card application control unit 350 executes and controls an application (corresponding to an example of the membership card managing program) used for implementing the process of the card application described with reference to FIG. 2. Such a card application control unit 350, as illustrated in FIG. 10, includes an authentication requesting unit 351, a use requesting unit 352, an association control unit 353, and a permission request control unit 354 and realizes and performs functions and actions of information processing to be described below. However, the internal configuration of the card application control unit 350 is not limited to the configuration illustrated in FIG. 10, and any other configuration may be employed as long as the information processing to be described later can be performed.

1-5(5). Authentication Requesting Unit 351

The authentication requesting unit 351 requests the user information managing apparatus 100 to authenticate the user by using the management-side user ID. More specifically, when a login screen is transmitted from the user information managing apparatus 100 in accordance with an access to the user information managing apparatus 100 according to a user's operation, the authentication requesting unit 351 transmits an authentication request including a user ID and a password input to the login screen to the user information managing apparatus 100. From this, an authentication process of a user is performed by the authentication unit 132 of the user information managing apparatus 100.

1-5(6). Use Requesting Unit 352

The use requesting unit 352 transmits a card issuing request used for requesting for the issuance of an electronic membership card to the user information managing apparatus 100 in accordance with a user's operation (corresponding to Step S102 illustrated in FIG. 2). For example, by displaying a list of issuable electronic membership cards on the display unit 320 through the user information managing apparatus 100, the use requesting unit 352 allows a user to select an electronic membership card that is a target for an issuance request. Then, the use requesting unit 352 transmits a card issuing request including a card ID of the electronic membership card selected by the user to the user information managing apparatus 100. At this time, the use requesting unit 352 updates the state information stored in the card storing unit 340 in association with the card ID to the "identity verification waiting state".

1-5(7). Association Control Unit 353

When a card registration link request form including a PIN, a link ID, a card ID, and user information is received from the user information managing apparatus 100 that has received a card issuing request transmitted from the use requesting unit 352, the association control unit 353 displays an input screen on which the user information is displayed in advance on the display unit 320. Then, the association control unit 353 transmits the user information input to the input screen and a card registration link request including the PIN, the link ID, and the card ID received from the user information managing apparatus 100 to the service providing apparatus 200 (corresponding to Step S105 illustrated in FIG. 2). From this, the association control unit 353 causes the service providing apparatus 200 to associate the link ID with the providing-side user ID that is used for identifying the user in the service providing apparatus 200.

In addition, when a card registration link response is received from the service providing apparatus 200, the association control unit 353 transmits the card registration link response to the user information managing apparatus 100 through a redirection (corresponding to Step S107 illustrated in FIG. 2).

1-5(8). Permission Request Control Unit 354

The permission request control unit 354 performs various processes for enabling the electronic membership card to be used. More specifically, when a card issuance response (store visiting request) is received from the user information managing apparatus 100, the permission request control unit 354 updates the state information stored in the card storing unit 340 in association with the card ID included in the card issuance response to the "store-visiting requested state".

In addition, in a case where a PIN is input from the user, the permission request control unit 354 transmits a card use setting request including the input PIN and the card ID of an electronic membership card of which the PIN has been input to the user information managing apparatus 100 (corresponding to Step S113 illustrated in FIG. 2). Such a card use setting request corresponds to a notification of satisfaction used for notifying that the identity of the user is verified. Then, when a card use setting response transmitted from the user information managing apparatus 100 is received in response to the card use setting request, the permission request control unit 354 updates the state information stored in the card storing unit 340 in association with the card ID included in the card use setting response to the "usable state".

1-5(9). Example of Display Screen

Next, an example of the screen displayed by the card application control unit 350 of the terminal apparatus 300 according to the first embodiment will be described with reference to FIGS. 12A to 12D. FIG. 12A illustrates a screen of a list of electronic membership cards. As illustrated in FIG. 12A, on the screen of the list, a list of electronic membership cards managed by the card application is displayed. The card application control unit 350 displays the screen of the list based on information stored in the card storing unit 340. FIG. 12A illustrates an example in which electronic membership cards C11 to C15 are displayed on the screen of the list.

Although the card application control unit 350 displays the electronic membership cards that are permitted to be used or during an issuance request, all the issuable electronic membership cards may be displayed on the screen of the list. For example, the card application control unit 350 acquires information (the card ID, the barcode, or the like) relating to the issuable electronic membership cards by accessing the user information managing apparatus 100 and stores the acquired information in the card storing unit 340.

In addition, the card application control unit 350 may display the screen of a list for the information of each state of the card storing unit 340. For example, the card application control unit 350 may display the screen of a list that is divided into electronic membership cards that are in the usable state, electronic membership cards that are in the identity verification waiting state, electronic membership cards that are in the store-visiting requested state, and electronic membership cards that are in the no-request state.

FIGS. 12B to 12D illustrate an example of enlarged screens of electronic membership cards. As illustrated in FIGS. 12B to 12D, on the enlarged screens of electronic membership cards, an image of an electronic membership card C11, a barcode 311, and a state display field T11 are displayed. When an operation of selecting one of electronic membership cards C11 to C15 is performed on the screen of the list illustrated in FIG. 12A, the card application control unit 350 displays an enlarged screen of the selected electronic membership card based on various kinds of information stored in the card storing unit 340. In addition, FIGS. 12B to 12D illustrate an example in which the electronic membership card C11 is selected.

Described more specifically, when the electronic membership card C11 of which the state information stored in the card storing unit 340 is the "identity verification waiting state" is selected, as illustrated in FIG. 12B, the card application control unit 350 displays information representing "during a use request" in the state display field T11.

In addition, when the electronic membership card C11 of which the state information has been updated to the "store-visiting requested state" is selected thereafter, as illustrated in FIG. 12C, the card application control unit 350 displays information "Please come to the store" in the state display field T11. At this time, the card application control unit 350 displays a PIN input field T12 as well. In other words, the user can select an electronic membership card on the screen of the list illustrated in FIG. 12A and input a PIN on the enlarged screen illustrated in FIG. 12C. Then, when an operation (an operation of pressing a confirmation button not illustrated in the figure) of confirming the input of the PIN is performed, the permission request control unit 354 of the card application control unit 350 transmits a card use setting request including the card ID of the electronic membership card C11 and the PIN input to the PIN input field T12 to the user information managing apparatus 100.

Furthermore, when the electronic membership card of which the state information has been updated to the "usable state" is selected thereafter, as illustrated in FIG. 12D, the card application control unit 350 displays information "use permitted" in the state display field T11.

In the example illustrated in FIGS. 12B to 12D, an example is presented in which the barcode is displayed regardless whether the electronic membership card is permitted to be used. However, the card application control unit 350 may display a barcode of only an electronic membership card that is in the usable state.

1-6. Processing Sequence of Membership Managing System

Figure 13:
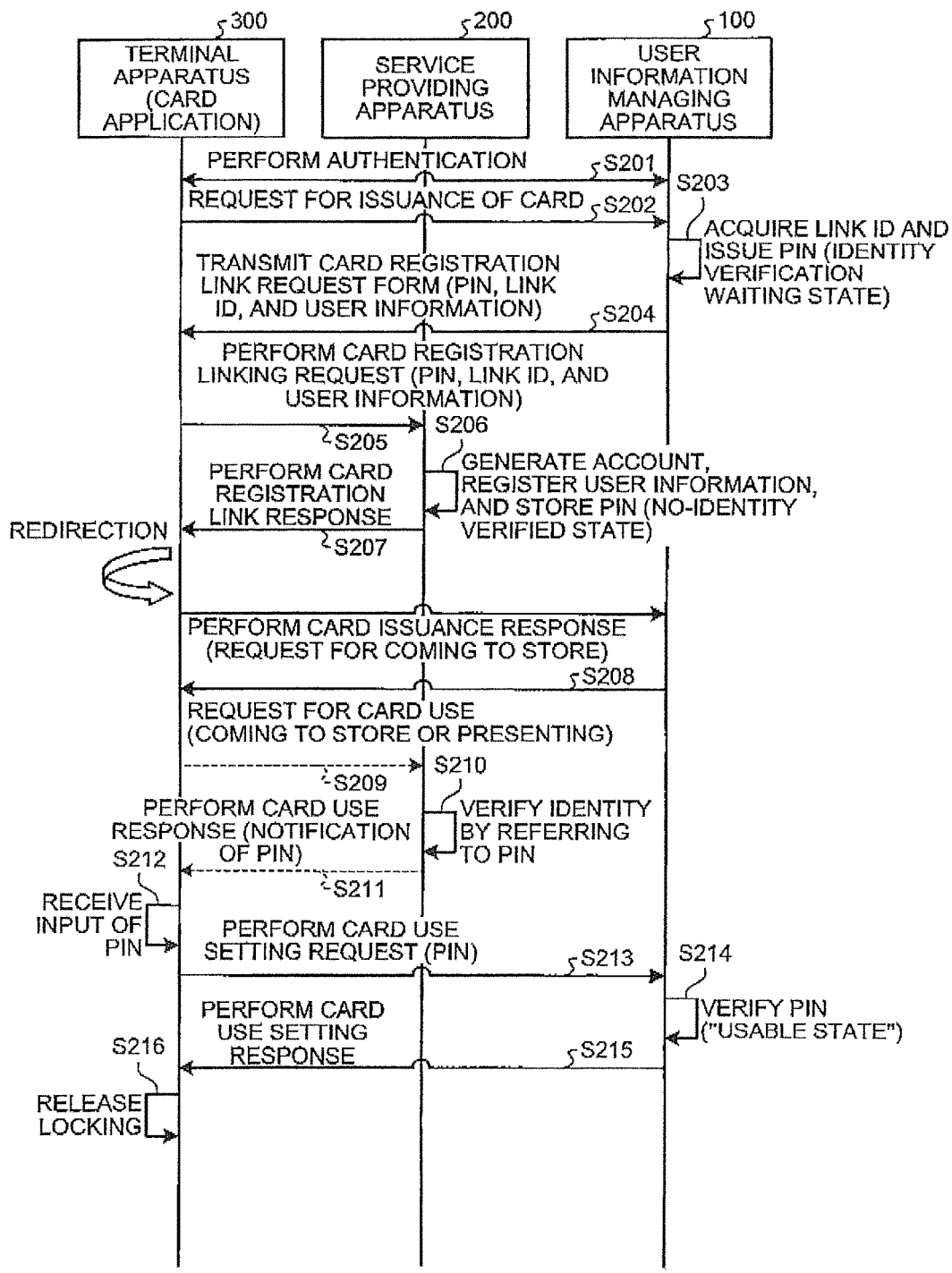
FIG. 13 is a sequence diagram that illustrates the processing sequence of the membership managing system according to the first embodiment.

Next, the processing sequence of the membership managing system 1 according to the first embodiment will be described with reference to FIG. 13. FIG. 13 is a sequence diagram that illustrates the processing sequence of the membership managing system 1 according to the first embodiment.

As illustrated in FIG. 13, the authentication unit 132 of the user information managing apparatus 100 authenticates a user using the terminal apparatus 300 in accordance with a request from the authentication requesting unit 351 of the terminal apparatus 300 in Step S201. Subsequently, the use requesting unit 352 of the terminal apparatus 300 transmits a card issuing request to the user information managing apparatus 100 in accordance with a user's operation in Step S202.

Subsequently, the verification code generating unit 133 of the user information managing apparatus 100 generates a PIN, and the account linking unit 134 acquires a link ID and updates the usable or non-usable state to the "identity verification waiting state" in Step S203.

Subsequently, the account linking unit 134 of the user information managing apparatus 100 transmits a card registration link request form including the PIN, the link ID, and the user information to the terminal apparatus 300 in Step S204. Subsequently, the association control unit 353 of the terminal apparatus 300 transmits a card registration link request including the PIN, the link ID, and the user information to the service providing apparatus 200 in Step S205.

Subsequently, the account managing unit 232 of the service providing apparatus 200 stores the user information in the management information storing unit 222 and generates an account of the user using the terminal apparatus 300, and the verification code managing unit 233 stores the PIN in the management information storing unit 222 in Step S206. Subsequently, the account linking unit 234 associates the link ID with the providing-side user ID and then transmits a card registration link response to the user information managing apparatus 100 through the terminal apparatus 300 in Step S207. Then, the account linking unit 134 of the user information managing apparatus 100 transmits a card issuance response to the terminal apparatus 300 in Step S208.

Thereafter, in a case where the user using the terminal apparatus 300 comes to the store, presents a document that can be used for verifying the identity in Step S209, and performs identity verification according to the service provider in Step S210, the user is notified of the PIN from the service provider in Step S211.

Subsequently, when a PIN is input from the user in Step S212, the permission request control unit 354 transmits a card use setting request including the input PIN to the user information managing apparatus 100 in Step S213. Then, when the authentication of the PIN is successful, the account state managing unit 135 updates the usable or non-usable state to the "usable state" in Step S214 and transmits a card use setting response to the terminal apparatus 300 in Step S215. From this, the permission request control unit 354 of the terminal apparatus 300 sets the electronic membership card requested in the card issuing request to be in the usable state (releasing lock) in Step S216.

1-7. Modified Example (First Embodiment)

The membership managing system 1 according to the first embodiment described above may be performed in various forms other than the above-described embodiment. Hereinafter, other embodiments of the above-described membership managing system 1 will be described.

1-7(1). Issuance Process without Using PIN

Figure 14:
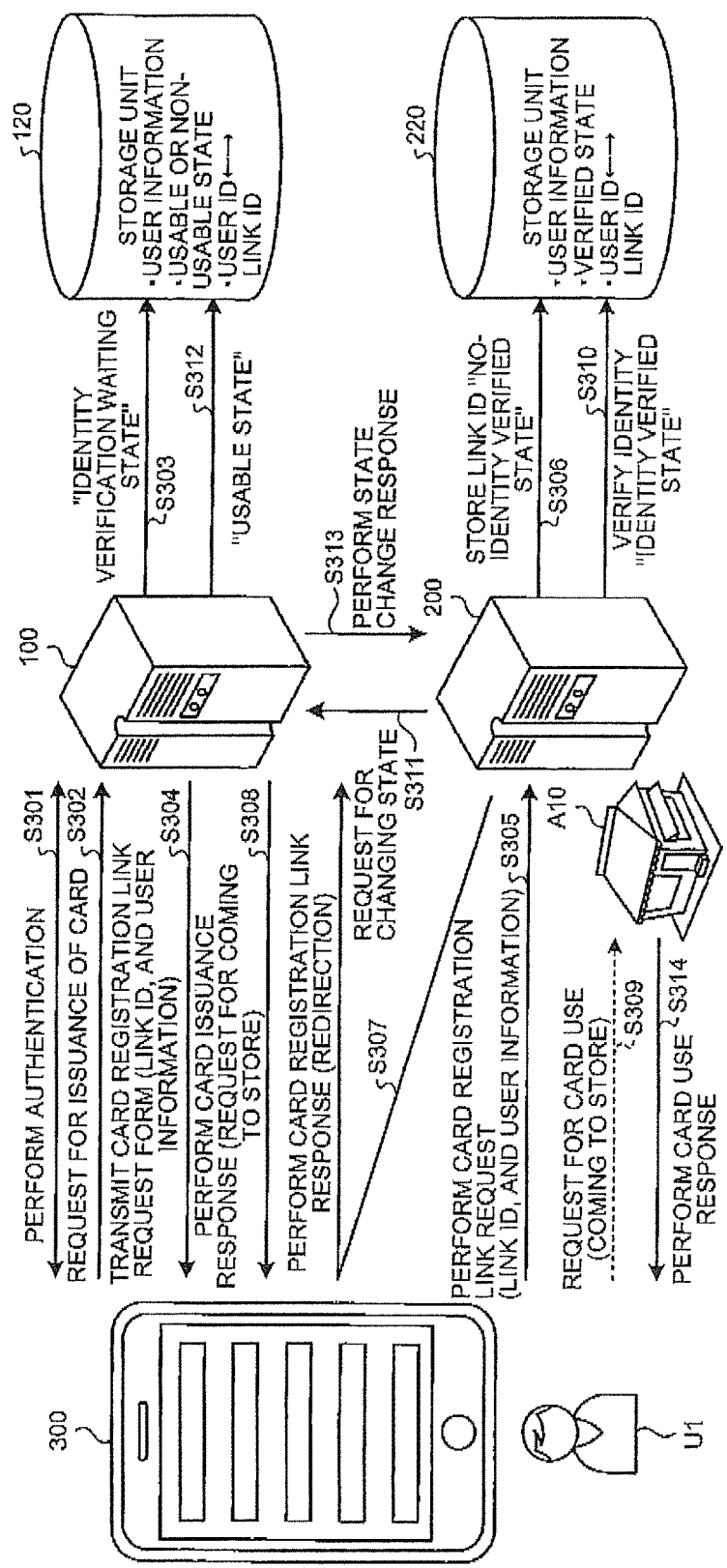
FIG. 14 is a diagram that illustrates an example of a membership card issuing process of a membership managing system according to a modified example.

In the above-described embodiment, the electronic membership card issuing process using a PIN has been described. However, the membership managing system 1 according to the first embodiment may perform the electronic membership card issuing process without using a PIN. This point will be described with reference to FIG. 14. FIG. 14 is a diagram that illustrates an example of the membership card issuing process of the membership managing system 1 according to a modified example. Hereinafter, the description of the process that is the same as that illustrated in FIG. 2 will not be presented.

As illustrated in FIG. 14, the user information managing apparatus 100 authenticates a user U1 using the terminal apparatus 300 in Step S301. Subsequently, the terminal apparatus 300 transmits a card issuing request indicating the issuance of an electronic membership card of a store A10 to the user information managing apparatus 100 in accordance with an operation performed by the user U1 in Step S302.

Subsequently, when the card issuing request is received from the terminal apparatus 300 that has succeeded in the authentication, the user information managing apparatus 100 updates the usable or non-usable state corresponding to the user U1 and the store A10 to the "identity verification waiting state" in Step 3303. At this time, the user information managing apparatus 100 does not issue a PIN.

Subsequently, the user information managing apparatus 100 transmits a card registration link request form including a link ID and user information (a name, and the like) to the terminal apparatus 300 in Step S304. Then, when an operation of completing the input of the user information is performed, the terminal apparatus 300 transmits a card registration link request including the input user information and the link ID to the service providing apparatus 200 in Step S305.

When the card registration link request is received from the terminal apparatus 300, the service providing apparatus 200 stores the user information included in the card registration link request in the user information storing unit 221 in Step S306. Subsequently, the service providing apparatus 200 transmits a card registration link response to the user information managing apparatus 100 through the terminal apparatus 300 in Step S307.

When the card registration link response is received, the user information managing apparatus 100 transmits a card issuance response to the terminal apparatus 300 in Step S308. Thereafter, the user U1 comes to the store A10 and requests (card use request) a clerk or the like to enable the use of the electronic membership card in Step S309.

Then, when identity verification is made by the clerk of the store A10 (Step 3310), the service providing apparatus 200 (the account state managing unit 236) transmits a state changing request that is a request for changing the state of the electronic membership card to the usable state to the user information managing apparatus 100 in Step S311. At this time, the service providing apparatus 200 (the account state managing unit 236) transmits a state changing request including the card ID of the electronic membership card, which is a target for the issuance, and the link ID of the user who has come to the store to the user information managing apparatus 100. Such a state changing request corresponds to a notification of satisfaction used for notifying that the identity of the user has been verified.

Subsequently, when the state changing request is received from the service providing apparatus 200, the user information managing apparatus 100 (the account state managing unit 135) updates the usable or non-usable state, which is stored in the management information storing unit 122 in association with the card ID and the link ID included in the state changing request, to the "usable state" in Step S312. Then, the user information managing apparatus 100 (the account state managing unit 135) transmits a state changing response indicating the change to the usable state to the service providing apparatus 200 in Step S313.

When the state changing response is received from the user information managing apparatus 100, the service providing apparatus 200 (the account state managing unit 236) transmits a card use response to the terminal apparatus 300 in Step S314. Such a card use response corresponds to a notification of change for notifying that the user permission state has been changed to the usable state in the user information managing apparatus 100. Then, when the card use response is received, the terminal apparatus 300 sets the electronic membership card corresponding to the store A10 to be in the usable state under the control of the card application.

As above, according to the membership managing system 1 of the first embodiment, even in a case where a PIN is not used, the same advantage as that of the electronic membership card issuing process illustrated in FIG. 2 can be acquired. In the example illustrated in FIG. 14, the user's effort for inputting a PIN can be reduced. In addition, in the example illustrated in FIG. 14, the user information managing apparatus 100 may not include the verification code generating unit 133, and the service providing apparatus 200 may not include the verification code managing unit 233.

1-7(2). Electronic Membership Card

In the above-described embodiment, as an example of a medium used for exercising a right for receiving a service in a facility, the electronic membership card has been described. However, the medium for exercising the right may not be a membership card but may be an array of simple numbers or symbols. In this application, the arrangement of numbers or symbols is regarded as one type of electronic membership card.

1-7(3). Advertisement Delivery

In the above-described embodiment, the service providing apparatus 200 may include an acquisition unit that acquires information (membership registration statuses in other stores, a web page browsing history, a search history in a search engine, or the like) relating to the user from the user information managing apparatus 100 or an advertisement delivery unit that delivers an advertisement to the terminal apparatus 300 based on the acquired information. As above, the service providing apparatus 200 can associate the user ID for the user information managing apparatus 100, information relating to each user can be acquired from the user information managing apparatus 100. As a result of this, the effect of the advertisement delivery can be improved, and an effective recommendation can be made.

1-7(4). NG Notification

In the above-described embodiment, an example has been illustrated in which, by verifying the identity of a user coming to the store, it is checked whether or not the user satisfies the requirement information stored in the requirement storing unit 223. However, the checking of whether or not the user satisfies the requirement information is not limited to this example, and the service providing apparatus 200 may compare user information included in a card registration link request and the requirement information of the requirement storing unit 223 with each other when the card registration link request is received. Then, in a case where the requirement information is not satisfied, the service providing apparatus 200 may transmit a notification of NG indicating that the issuance of an electronic membership card is not permitted to the terminal apparatus 300. From this, the service providing apparatus 200 can prevent the issuance of an electronic membership card to a user not satisfying the requirement information without user's coming to the store.

1-7(5). Identity Verification

In the above-described embodiment, an example has been illustrated in which identity verification is performed by service provider's visual observation or reading personal information from a user's IC card or the like using the identity verification unit 235. However, the identity verification is not limited to this example, and the identity verification unit 235 may perform identity verification by reading an electronic membership card stored in the terminal apparatus 300. More specifically, a barcode may be stored in the card storing unit 340 even in a state in which the use of the electronic membership card is not permitted. For example, as described above, the user information managing apparatus 100 may communicate with the terminal apparatus 300 after the card application is supplied to the terminal apparatus 300, thereby delivering a card ID and a barcode of an electronic membership card that is a candidate for an issuance request target to the terminal apparatus 300. In such a case, the identity verification unit 235 may read the barcode of the electronic membership card that is displayed on the terminal apparatus 300 in an enlarged scale and compare the personal information obtained from the read barcode and the user information of the user information storing unit 221 or the requirement information of the requirement storing unit 223 with each other. In addition, in a case where an admission fee or the like is transferred to a predetermined bank account from a user, the identity verification unit 235 may regard that the identity verification is performed. In such a case, the requirement of a user for being registered as a member in the service provider is the "transfer of the admission fee".

In the above-described embodiment, an example has been illustrated in which the identity verification is performed by a user coming to the store. However, the place at which the identity verification is performed is not limited to the store. For example, the service provider may perform identity verification by inquiring the user of the name, the address, the date of birth, and the like through a phone call. In addition, for example, the service provider may perform identity verification by receiving a document that can be used for checking the person from a user by mail or electronic mail.

1-7(6). Link ID

In the above-described embodiment, as the example illustrated in FIG. 5, an example has been illustrated in which a link ID is assigned to each management-side user ID. However, the link ID may be assigned to each combination of a management-side user ID and a card ID. In addition, the link ID may be issued by the service providing apparatus 200 and transmitted to the user information managing apparatus 100 instead of being issued by the user information managing apparatus 100.

1-7(7). Subject of Processing

The subject of the processing performed by each constituent element described above is not limited to the example described above. For example, in the above-described embodiment, an example has been illustrated in which the account linking unit 134 stores the "identity verification waiting state" in the usable or non-usable state of the management information storing unit 122. However, the process of updating the usable or non-usable state of the management information storing unit 122 may be performed all by the account state managing unit 135.

1-7(8). Configuration of Storage Unit

The configuration of the storage unit illustrated in the above-described embodiment is not limited to the example illustrated in the figure. For example, the user information managing apparatus 100 may include a storage unit storing the link ID in association with the management-side user ID, a storage unit storing the PIN in association with the management-side user ID, and a storage unit storing the usable or non-usable state or the identity verification date and time in association with the management-side user ID. Similarly, the service providing apparatus 200 may include a storage unit divided for each item.

1-8. Advantages

As described above, the membership managing system 1 according to the first embodiment includes the user information managing apparatus (corresponding to an example of a management apparatus) 100, the service providing apparatus 200 used by a service provider providing services in a facility (a store or the like), and the terminal apparatus 300 used by the user. The user information managing apparatus 100 includes the management information storing unit (corresponding to an example of a usable or non-usable storing unit) 122, the account linking unit (corresponding to a transmission unit) 134, and the account state managing unit (corresponding to an example of a permission unit) 135. The management information storing unit 122 stores the usable or non-usable state representing whether the electronic membership card is usable or non-usable by a user in the facility. When a card issuing request (corresponding to an example of a use request) for an electronic membership card is received from the terminal apparatus 300, the account linking unit 134 updates the usable or non-usable state stored in the management information storing unit 122 to the non-usable state representing that the electronic membership card is non-usable and transmits the card registration link request form (corresponding to an example of the use request) to the terminal apparatus 300. When a card use setting request (corresponding to a notification of satisfaction) indicating that the user is verified by the service providing apparatus 200 is received from the terminal apparatus 300, the account state managing unit 135 updates the usable or non-usable state to the usable state representing that the electronic membership card is usable, whereby the user's use of the electronic membership card is permitted.

From this, in the membership managing system 1 according to the first embodiment, even in a case where a card issuing request is received by the user information managing apparatus 100 from the terminal apparatus 300, the use of the electronic membership card is not permitted to be used unless the identity of the user is verified in the store. From this, in the membership managing system 1 according to the first embodiment, an electronic membership card corresponding to the requirements (security policy) of membership registration for each store can be issued.

In addition, when a card issuing request is received from the terminal apparatus 300, the account linking unit (corresponding to an example of a second association unit) 134 of the user information managing apparatus 100 according to the first embodiment associates the link ID (corresponding to an example of correspondence information) corresponding to the management-side user ID used for identifying the user in the user information managing apparatus 100 with the management-side user ID and transmits a card registration link request form including the link ID. In addition, the account linking unit (corresponding to an example of a second association unit) 234 of the service providing apparatus 200 associates the corresponding information included in the card registration link request form transmitted by the account linking unit 134 with the providing-side user ID used for identifying the user in the service providing apparatus 200.

From this, the membership managing system 1 according to the first embodiment can associate the user IDs, which are individually managed by the user information managing apparatus 100 and the service providing apparatus 200, with each other using the link ID. From this, for example, the service providing apparatus 200 can acquire information relating to a user from the user information managing apparatus 100 and deliver an advertisement to the terminal apparatus 300 based on the acquired information. In addition, the service provider can recommend a product to a user U1 coming to the store A10 by using the information acquired from the user information managing apparatus 100.

In addition, when a card issuing request is received from the terminal apparatus 300, the account linking unit 134 of the user information managing apparatus 100 according to the first embodiment transmits a card registration link request form together with the user information relating to the user to the terminal apparatus 300. The association control unit (corresponding to an example of a terminal transmission unit) 353 of the terminal apparatus 300 allows the user to check or edit the user information transmitted by the account linking unit 134 and transmits a card registration link request (corresponding to an example of a use request) including the user information after the checking or editing to the service providing apparatus 200. In addition, when the card registration link request transmitted by the association control unit 353 is received, the account linking unit 234 of the service providing apparatus 200 generates a providing-side user ID corresponding to the user using the terminal apparatus 300 based on the user information included in the card registration link request and associates the link ID with the generated providing-side user ID.

From this, according to the membership managing system 1 according to the first embodiment, user registration can be made for the service providing apparatus 200 through user's simple input, and the process of issuing an electronic membership card and the process of associating user IDs can be realized at the time of user registration.

In addition, when a card issuing request is received from the terminal apparatus 300, the account linking unit 134 of the user information managing apparatus 100 according to the first embodiment transmits a card registration link request form including a PIN (corresponding to an example of an identification number) assigned to each card issuing request to the terminal apparatus 300. When an input of the PIN is received from the user verified by the service provider, the permission request control unit 354 of the terminal apparatus 300 transmits a card use setting request (corresponding to an example of a notification of satisfaction) including the input PIN to the user information managing apparatus 100. In addition, the account state managing unit 135 of the user information managing apparatus 100 permits the use of the electronic membership card to the user in a case where the PIN transmitted by the permission request control unit 354 and the PIN transmitted by the account linking unit 134 match each other.

From this, the user information managing apparatus 100 according to the first embodiment can determine whether or not the identity of the user is actually verified with high accuracy by performing verification using the PIN. In other words, the user information managing apparatus 100 can safely issue an electronic membership card.

Second Embodiment

In the above-described first embodiment, an example has been described in which an electronic membership card is newly issued to a user who does not have an account in the service providing apparatus 200. However, the above-described membership managing system 1 can also issue an electronic membership card corresponding to a physical membership card to a user having an account in the service providing apparatus 200 and holding the physical membership card. Thus, in the second embodiment, an example will be described in which an electronic membership card corresponding to a physical membership card is issued. In addition, while the second embodiment can be applied to both the embodiments illustrated in FIGS. 2 and 14, hereinafter, an example will be described in which the second embodiment is applied to the embodiment illustrated in FIG. 2. Furthermore, the configuration of a membership managing system 1, the configuration of a user information managing apparatus 100, and the configuration of the service providing apparatus 200 according to the second embodiment are the same as those of the first embodiment, and thus, the description thereof will not be presented.

2-1. Configuration of Terminal Apparatus

Figure 15:
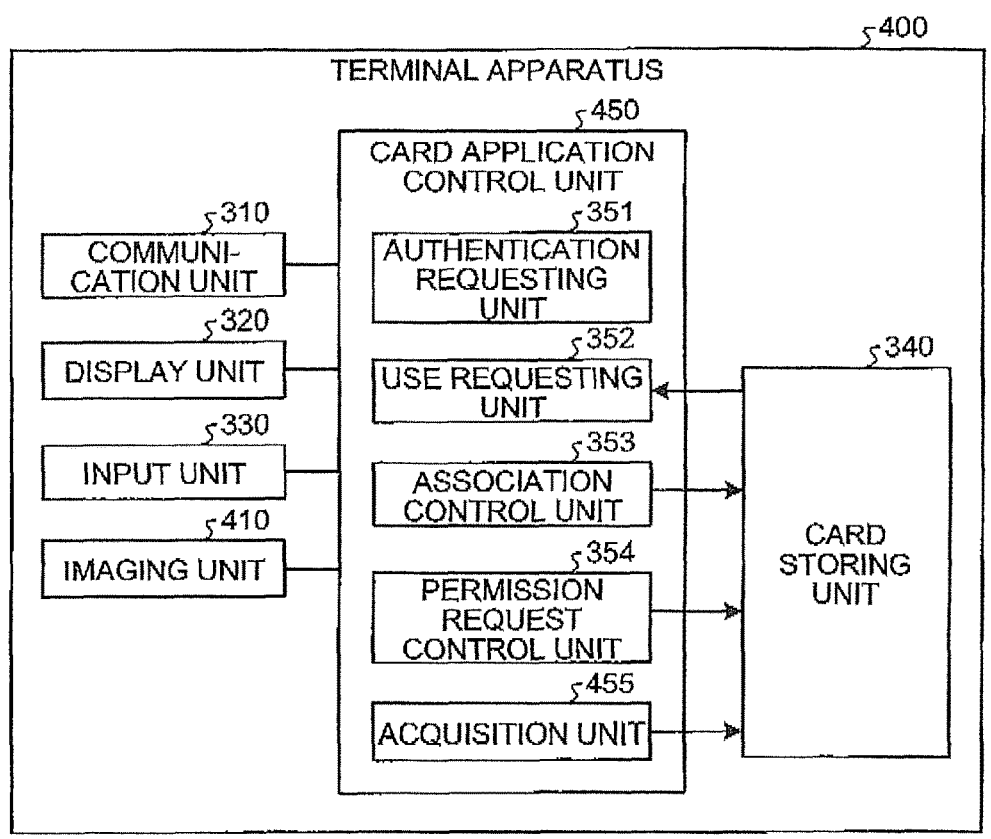
FIG. 15 is a diagram that illustrates an example of the configuration of a terminal apparatus according to a second embodiment.

First, the configuration of a terminal apparatus 400 according to the second embodiment will be described with reference to FIG. 15. As illustrated in FIG. 15, the terminal apparatus 400 according to the second embodiment includes an imaging unit 410 and an acquisition unit 455 inside a card application control unit 450.

The imaging unit 410 implements a camera function for imaging a predetermined object. The imaging unit 410 generates an image of an object by imaging the predetermined object in accordance with an operation received from a user through an input unit 330.

The acquisition unit 455 stores information relating to a physical membership card in a card storing unit 340. More specifically, when an operation for acquiring a physical membership card from the user is performed, the acquisition unit 455 allows the user to have the physical membership card imaged by starting the operation of the imaging unit 410. Then, the acquisition unit 455 acquires a card ID from image data of the physical membership card that is generated by the imaging unit 410, acquires a barcode that is visualized in the image data, and stores the card ID and the barcode, which have been acquired, in the card storing unit 340. At this time, the acquisition unit 455 stores the "identity verification waiting state" or the "no-request state" in the state information. In addition, in a case where a card ID cannot be acquired from the image data of the physical membership card, the acquisition unit 455 may acquire a card ID from the service providing apparatus 200 by transmitting the image data to the user information managing apparatus 100 or the service providing apparatus 200.

2-2. Electronic Membership Card Issuing Process

Figure 16:
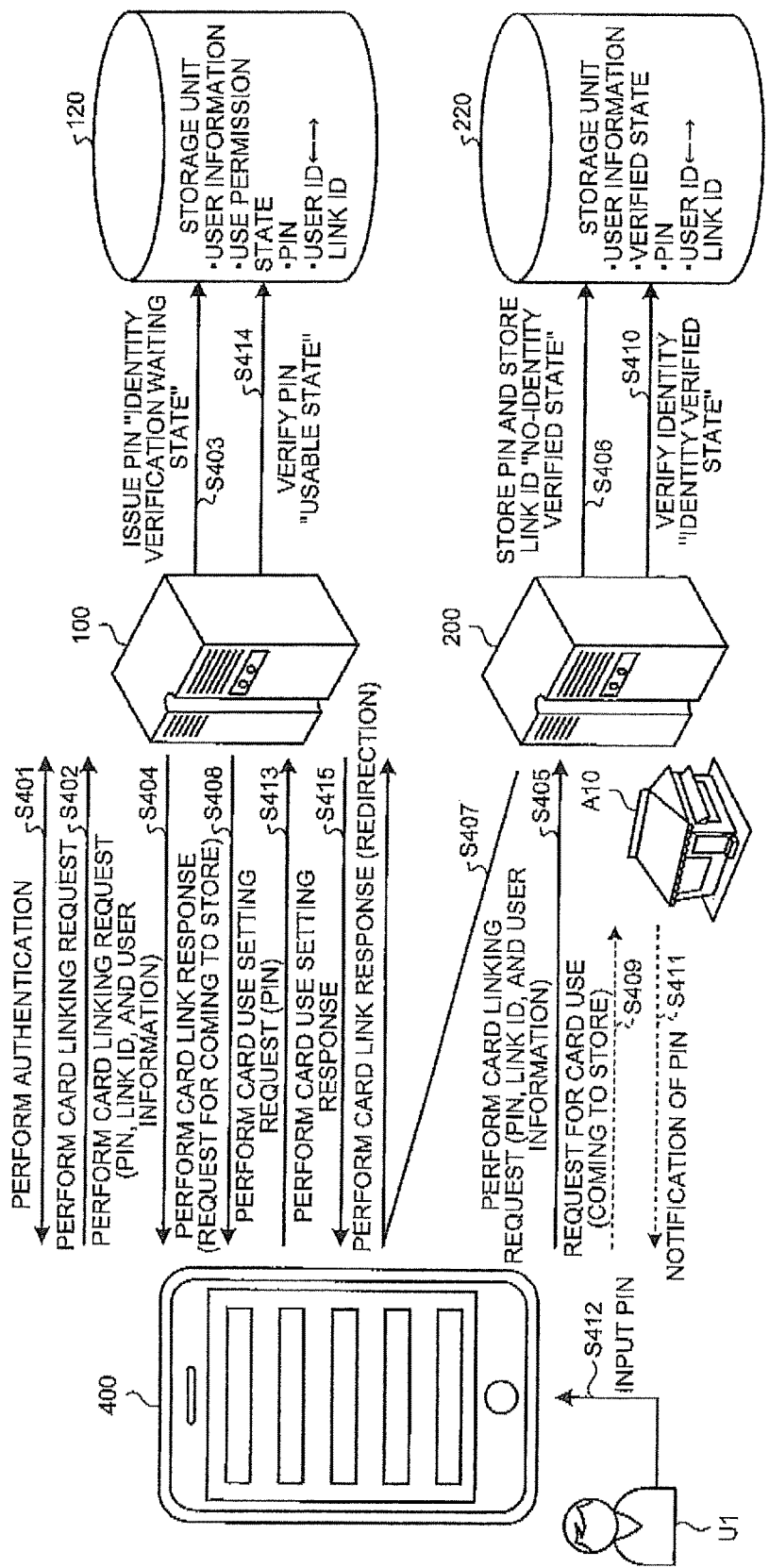
FIG. 16 is a diagram that illustrates an example of a membership card issuing process of a membership managing system according to the second embodiment.

FIG. 16 is a diagram that illustrates an example of the membership card issuing process of a membership managing system 1 according to the second embodiment. Hereinafter, description of the process that is the same as that illustrated in FIG. 2 will not be presented.

First, as a premise, it is assumed that a user U1 illustrated in FIG. 16 has an account in the service providing apparatus 200 and holds a physical membership card that can be used in a store A10. Then, it is assumed that the user U1 captures the physical membership card in a card application installed to the terminal apparatus 400.

Under the premise, when being accessed from the terminal apparatus 400, the user information managing apparatus 100 authenticates a user U1 in Step S401. Subsequently, the terminal apparatus 400 transmits a card linking request for issuing an electronic membership card of the store A10 to the user information managing apparatus 100 in accordance with an operation of the user U1 in Step 3402. Since the user U1 holds accounts in both the user information managing apparatus 100 and the service providing apparatus 200, this card linking request corresponds to a request for associating (linking) both accounts.

Subsequently, when the card linking request is received from the terminal apparatus 400 of which the authentication is successful, the user information managing apparatus 100 issues a personal identification number (PIN), acquires a link ID corresponding to the management-side user ID of the user U1, and updates the usable or non-usable state to the "identity verification waiting state" in Step S403.

Subsequently, the user information managing apparatus 100 transmits a card linking request including the PIN, the link ID, and the user information (the name and the like) to the terminal apparatus 400 in Step S404. In the second embodiment, since the user U1 has an account in the service providing apparatus 200, the user information managing apparatus 100 according to the second embodiment, differently from that of the first embodiment, does not transmit an input form used for generating an account to the terminal apparatus 400.

Subsequently, the terminal apparatus 400 transmits the card linking request received from the user information managing apparatus 100 to the service providing apparatus 200 in Step S405. The terminal apparatus 400 may allow the user U1 to check the user information by displaying the user information or may automatically transmit the card linking request to the service providing apparatus 200 without the user information being checked by the user U1.

Subsequently, the service providing apparatus 200 performs the same process as that of Step S106 illustrated in FIG. 2 in Step S406 and transmits a card link response as a response to the card linking request to the user information managing apparatus 100 through the terminal apparatus 400 in Step S407.

When the card link response is received, the user information managing apparatus 100 transmits the card link response as a response to the card linking request received in Step S402 to the terminal apparatus 400 in Step S408. Such a card link response is for notifying the user U1 of a request to come to the store A10 for identity verification.

Thereafter, when the user U1 of which the identity is verified in the store A10 inputs a PIN to the card application in Steps S409 to S412, the terminal apparatus 400 transmits a card use setting request including the input PIN to the user information managing apparatus 100 in Step 3413. The process performed thereafter in Steps S414 and S415 is the same as that of Steps S114 and S115 illustrated in FIG. 2, and thus, the description thereof will not be presented.

As above, according to the membership managing system 1 of the second embodiment, an electronic membership card can be issued from a store, which has issued a physical membership card, using the membership card. In other words, according to the membership managing system 1 of the second embodiment, even when a physical membership card has been issued, the same advantages as those of the first embodiment can be acquired.

In addition, in the example illustrated in FIG. 16, since the user is in the state being registered in the service providing apparatus 200, the user information does not need to be distributed in Steps S404 and S405.

Third Embodiment

Examples have been described in which the user information managing apparatuses 100 according to the first and second embodiments permit the use of an electronic membership card in a case where identity is verified. However, in a case where a predetermined condition is satisfied, the user information managing apparatus 100 may permit the use of the electronic membership card even in a case where the identity is not verified. Thus, in the third embodiment, an example will be described in which the use of an electronic membership card is permitted in a case where the identity is not verified will be described. While the third embodiment may be applied to the first embodiment (both embodiments illustrated in FIGS. 2 and 14) and the second embodiment, hereinafter, an example will be described in which the third embodiment is applied to the embodiment illustrated in FIG. 2. Furthermore, the configuration of a membership managing system 1, the configuration of a service providing apparatus 200, and the configuration of a terminal apparatus 300 according to the third embodiment are the same as those of the first embodiment, and thus, the description thereof will not be presented.

3-1. Configuration of User Information Managing Apparatus

Figure 17:
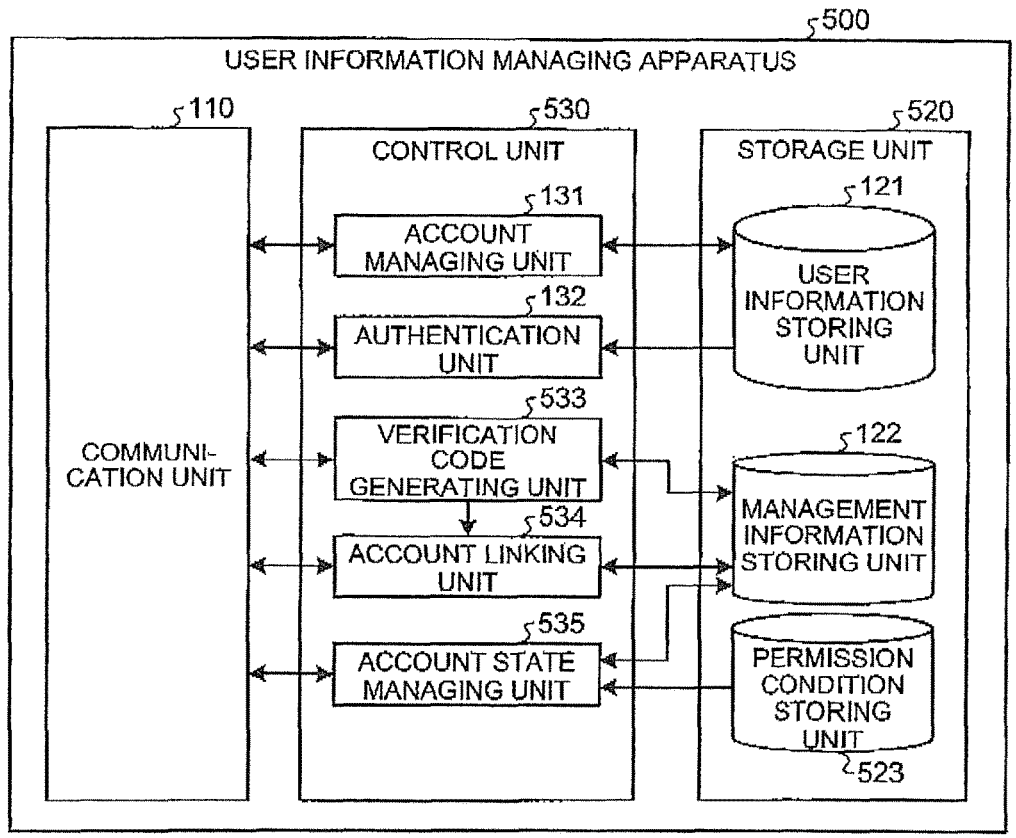
FIG. 17 is a diagram that illustrates an example of the configuration of a user information managing apparatus according to a third embodiment.

First, the configuration of a user information managing apparatus 500 according to the third embodiment will be described with reference to FIG. 17. As illustrated in FIG. 17, the user information managing apparatus 500 according to the third embodiment includes a permission condition storing unit 523 within a storage unit 520 and includes a verification code generating unit 533, an account linking unit 534, and an account state managing unit 535 within a control unit 530.

3-1(1). Permission Condition Storing Unit 523

Figure 18:
FIG. 18 is a diagram that illustrates an example of a permission condition storing unit according to the third embodiment.

For each store issuing an electronic membership card that can be managed by the user information managing apparatus 500, the permission condition storing unit 523 stores a permission condition for permitting the issuance of the electronic membership card in the store. Here, FIG. 18 illustrates an example of the permission condition storing unit 523 according to the third embodiment. In the example illustrated in FIG. 18, the permission condition storing unit 523 includes items of "store ID" and "permission condition".

The "store ID" represents an identifier that is used for identifying a store providing various services by the service provider. The "permission condition" represents a user's requirement (a condition or a limit) for which the use of the electronic membership card is permitted. Such a permission condition corresponds to the use requirements stored in the requirement storing unit 223 illustrated in FIG. 9. In addition, according to the third embodiment, in the permission condition, an update condition for permitting the update of a period during which the electronic membership card can be used is included.

In other words, in the case of the example illustrated in FIG. 18, a store identified by a store ID "X01" issues an electronic membership card when the identity is verified. In addition, a store identified by a store ID "X02" issues an electronic membership card in a case where the identity has been verified in an affiliated store. In the case of the example illustrated in FIG. 18, a store identified by a store ID "X03" issues an electronic membership card when the identity has been verified within one year. In addition, in the case of the example illustrated in FIG. 18, an update condition is included in a permission condition, and a store identified by a store ID "X04" issues an electronic membership card in a case where the identity is verified, but the electronic membership card is not permitted to be used unless the identity is verified once a year.

3-1(2). Account State Managing Unit 535

The account state managing unit 535 determines whether to permit the use of the electronic membership card to the user using the terminal apparatus 300 based on the permission condition stored in the permission condition storing unit 523. In addition, the account state managing unit 535 sets the electronic membership card not to be permitted to be used based on the update condition included in the permission condition stored in the permission condition storing unit 523.

More specifically, when a card issuing request is received from the terminal apparatus 300, the account state managing unit 535 specifies a store corresponding to a card ID included in the card issuing request. For example, the account state managing unit 535 maintains correspondence data between a card ID and a store ID and specifies a store corresponding to the card ID based on the correspondence data. Then, the account state managing unit 535 acquires a permission condition corresponding to the specific store from the permission condition storing unit 523. Then, the account state managing unit 535 determines whether to permit the use of the electronic membership card to the user based on the permission condition acquired from the permission condition storing unit 523 and various information stored in the management information storing unit 122. For example, in a case where the permission condition stored in the permission condition storing unit 523 is information of "no condition", the account state managing unit 535 permits the use of the electronic membership card to the user regardless of the reception of a card use setting request from the terminal apparatus 300.

Here, the process of the account state managing unit 535 will be described assuming that the permission condition storing unit 523 is in the state illustrated in FIG. 18. For example, a store ID corresponding to a card ID included in the card issuing request is assumed to be "X01". In such a case, since a permission condition of "identity verification" is stored in the permission condition storing unit 523, the account state managing unit 535, similarly to the account state managing unit 135 according to the first embodiment, does not permit the use of the electronic membership card unless the verification of the PIN is successful.

In addition, for example, it is assumed that a store ID corresponding to a card ID included in the card issuing request is "X02". In such a case, since the permission condition of "identity verification in an affiliated store" is stored in the permission condition storing unit 523, the account state managing unit 535 determines whether or not the identity of the user has been verified in an affiliated store of the store identified by a store ID "X02". More specifically, the account state managing unit 535 maintains affiliated store information in which store IDs are grouped for each affiliated group or the like and specifies affiliated stores of each store based on the affiliated store information. Then, the account state managing unit 535 determines whether or not the identity has been verified in an affiliated store by referring to the card ID and the usable or non-usable state of the management information storing unit 122. In a case where the identity has been verified in an affiliated store, the account state managing unit 535 updates the usable or non-usable state of the management information storing unit 122 to the "usable state", thereby permitting the user of the membership card. In such a case, the verification code generating unit 533 and the account linking unit 534 do not perform the generation process and the transmission process of a PIN. However, the account linking unit 534 performs the process of associating the management-side user ID and the providing-side user ID with each other using the link ID.

Furthermore, for example, it is assumed that a store ID corresponding to a card ID included in the card issuing request is "X04". In such a case, since the permission condition of "identity verification once a year" is stored in the permission condition storing unit 523, the account state managing unit 535, similarly to the account state managing unit 135 according to the first embodiment, does not permit the use of the electronic membership card unless the verification of the PIN is successful.

Here, the account state managing unit 535 monitors the permission condition storing unit 523 on a regular basis (for example, once a day) and sets the electronic membership card not satisfying the update condition to the non-usable state in a case where the update condition is set in the electronic membership card. For example, in the example illustrated in FIG. 18, the account state managing unit 535 specifies a card ID corresponding to the store ID "X04" and, in a case where the date and time of the identity verification of the management information storing unit 122 corresponding to the specified card ID is earlier than the current date and time by one year or more, updates the usable or non-usable state of the card ID to the "identity verification waiting state" and transmits a card invalidation setting for invalidating the card to the terminal apparatus 300. From this, the permission request control unit 354 of the terminal apparatus 300 updates the corresponding card ID state information to the "store-visiting requested state", the "identity verification waiting state", or the like, whereby the electronic membership card cannot be used.

In addition, the account state managing unit 535 may notify the terminal apparatus 300 of an invalidation condition for which the update condition is not satisfied before the update condition is not satisfied. For example, the account state managing unit 535 notifies the terminal apparatus 300 of the date and time when invalidation is performed, a date until invalidation is performed, or the like as the invalidation condition. From this, the account state managing unit 535 can urge the user to update the electronic membership card.

In addition, the account state managing unit 535 may lower the condition for permitting the use of the electronic membership card based on the records of an electronic membership card issued in the past. More specifically, in a case where the permission condition corresponding to a store for which the use of the electronic membership card is requested in the card issuing request received from the terminal apparatus 300 is lower than the permission condition satisfied by the user using the terminal apparatus 300 in the past, the account state managing unit 535 may permit the use of the electronic membership card to the user regardless of the reception of a card use setting request from the terminal apparatus 300.

For example, in the example illustrated in FIG. 18, it is assumed that the use of an electronic membership card issued by a store having a store ID "X06" has been permitted to a predetermined user U1 in the past. In other words, it is checked that the user U1 was "a female over 22 years old" in the past. Then, it is assumed that the terminal apparatus 300 of the user U1 transmits a card issuing request for an electronic membership card issued by a store having a store ID "X05". In such a case, since the permission condition of the store ID "X05" is lower than the permission condition of the store ID "X06", the account state managing unit 535 permits the use of the electronic membership card issued by the store having the store ID "X05" to the user U1 regardless of reception of a card use setting request from the terminal apparatus 300. In addition, history information relating to the issuance of the electronic membership card is stored in the management information storing unit 122 or a log storing unit not illustrated in the figure.

3-2. Advantages

As above, the user information managing apparatus 500 according to the third embodiment determines whether to permit the use of the electronic membership card to the user using the terminal apparatus 300 based on the permission condition stored in the permission condition storing unit 523. From this, the user information managing apparatus 500 according to the third embodiment can respond to a security policy of each store in a flexible manner. In addition, the user information managing apparatus 500 can issue an electronic membership card not requiring user's effort such as coming to the store as possibly as can.

In addition, among the processes described in the above-described embodiments, all or a part of each process described to be automatically performed may be manually performed, or all or a part of each process described to be manually performed may be automatically performed using a known method. Furthermore, the processing sequence, a specific name, and information including various kinds of data or parameters, which have been illustrated in the document or drawing described above, may be arbitrarily changed unless otherwise mentioned.

In addition, each constituent element of each apparatus illustrated in the figure is functional and conceptual and does not need to be physically configured as illustrated in the figure. In other words, a specific form of the separation/integration of each apparatus is not limited to that illustrated in the figure, and all or a part thereof may be configured to be functionally or physically separated or integrated in an arbitrary unit in accordance with various loads, status of use, or the like.

Furthermore, the configurations of the user information managing apparatuses 100 and 500 and the service providing apparatus 200 described above may be changed in a flexible manner by being implemented by a plurality of server computers, calling an external platform or the like through an application programming interface (API), network computing, or the like depending on the functions thereof.

In addition, a "means" described in the claims may be replaced by a "section, module, or unit", a "circuit", or the like. For example, a permission means may be replaced by a permission unit or a permission circuit.

An aspect of the embodiments has an advantage of being capable of issuing a membership card corresponding to the requirements of a store for membership registration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Present invention as disclosed herein may be realized according to following notes 1 to 7.

Note 1. A non-transitory computer-readable storage medium with an executable program stored thereon, wherein the program instructs a computer to perform:

updating a usable or non-usable state, which represents whether a right is usable or non-usable by a user in a facility in which a service is provided by a service provider using a service providing apparatus, to a non-usable state representing that the right is non-usable in a case where a use request of the right is received from a terminal apparatus used by the user;

transmitting the use request to the terminal apparatus or the service providing apparatus; and permitting the use of the right to the user by updating the usable or non-usable state to a usable state representing that the right is usable in a case where a notification of satisfaction is received from the terminal apparatus or the service providing apparatus, the notification of satisfaction indicating that the user, who requests the use of the right in the use request transmitted at the transmitting, satisfies a use requirements of the right.

From this, in the non-transitory computer-readable storage medium according to note 1, an electronic membership card corresponding to the requirements (security policy) of membership registration for each store can be issued.

Note 2. A non-transitory computer-readable storage medium with an executable program stored thereon, wherein the program instructs a computer to perform:

first transmitting a use request of a right to be used by a user in a facility in which a service is provided by a service provider using a service providing apparatus to a management apparatus;

receiving the use request that is transmitted after a usable or non-usable state representing whether the right is usable or non-usable is updated to a non-usable state representing that the right in non-usable by a managing apparatus receiving the use request transmitted at the first transmitting;

second transmitting the use request received at the receiving to the service providing apparatus; and permitting the use of the right to the user in a case where a notification of change is received from the management apparatus or the service providing apparatus, the notification of change transmitted by the management apparatus receiving a notification of satisfaction indicating that the user, who requests the use of the right in the use request transmitted at the second transmitting, satisfies a use requirements of the right.

From this, in the non-transitory computer-readable storage medium according to note 2, an electronic membership card corresponding to the requirements (security policy) of membership registration for each store can be issued.

Note 3. A membership managing system comprising:

a terminal apparatus used by a user;

a service providing apparatus that is used by a service provider providing a service in a facility; and a management apparatus, wherein the management apparatus comprises:

a usable or non-usable storing unit that stores a usable or non-usable state representing whether a right is usable or non-usable by the user in the facility;

a transmission unit that updates the usable or non-usable state stored in the usable or non-usable storing unit to a non-usable state representing that the right is non-usable in a case where the use request of the right is received from the terminal apparatus of the user and that transmits the use request to the terminal apparatus or the service providing apparatus; and a permission unit that permits the use of the right to the user by updating the usable or non-usable state to a usable state representing that the right is usable in a case where a notification of satisfaction is received from the terminal apparatus or the service providing apparatus, the notification of satisfaction indicating that the user, who requests the use of the right in the use request transmitted from the transmission unit, satisfies a use requirements of the right.

From this, in the membership managing system according to note 3, an electronic membership card corresponding to the requirements (security policy) of membership registration for each store can be issued.

Note 4. The membership managing system according to note 3, wherein the management apparatus further comprises a first association unit that associates correspondence information corresponding to a management-side user ID used for identifying the user in the management apparatus with the management-side user ID in a case where the use request is received from the terminal apparatus, wherein the transmission unit transmits the use request including the correspondence information, and wherein the service providing apparatus comprises a second association unit that associates the correspondence information included in the use request transmitted by the transmission unit with a providing-side user ID used for identifying the user in the service providing apparatus.

From this, the membership managing system according to note 4 can associate the user IDs, which are individually managed by the managing apparatus and the service providing apparatus, with each other using the correspondence information. For example, the service providing apparatus can acquire information relating to a user from the managing apparatus and deliver an advertisement to the terminal apparatus based on the acquired information. In addition, the service provider can recommend a product to a user coming to the facility by using the information acquired from the managing apparatus.

Note 5. The membership managing system according to note 4, wherein the transmission unit transmits the use request together with user information relating to the user in a case where the use request is received from the terminal apparatus, wherein the terminal apparatus comprises a terminal transmission unit that allows the user to check or edit the user information transmitted by the transmission unit and transmits the use request including the user information after the checking or editing to the service providing apparatus, and wherein the second association unit generates a providing-side user ID corresponding to a user of the terminal apparatus based on the user information included in the use request and associates the correspondence information with the generated providing-side user ID in a case where the use request transmitted by the terminal transmission unit is received.

From this, in the membership managing system according to note 5, the user registration can be made for the service providing apparatus through user's simple input, and the process of issuing an electronic membership card and the process of associating user IDs can be realized at the time of user registration.

Note 6. The membership managing system according to note 3, wherein the transmission unit transmits the use request including an identification number assigned to each use request to the terminal apparatus or the service providing apparatus in a case where the use request is received from the terminal apparatus, wherein the terminal apparatus comprises a notification unit that notifies the management apparatus of an input identification number as the notification of satisfaction in a case where the input of the identification number is received from a user verified by the service provider, and wherein the permission unit permits the use of the right to the user in a case where the identification number notified of by the notification unit and the identification number transmitted by the transmission unit match each other.

From this, in the membership managing system according to note 6, the managing apparatus can determine whether or not the identity of the user is actually verified with high accuracy by performing verification using the identification number. In other words, the managing apparatus can safely issue an electronic membership card.

Note 7. The membership managing system according to note 3, wherein the service providing apparatus comprises a response unit that transmits a response indicating that the use request is received in a case where the use request transmitted by the transmission unit is received, wherein the transmission unit transmits a store-visiting request for requesting the user to come to the facility to the terminal apparatus in a case where the response transmitted by the response unit is received, and wherein the terminal apparatus comprises a display unit that displays information indicating a request for coming to the facility in a case where the store-visiting request transmitted from the transmission unit is received.

What is claimed is:

1. A management apparatus for use with a user in at least one facility by a service provider, the management apparatus comprising:
  a memory storing a database storing a usable or non-usable state representing whether a right is usable or non-usable by the user in the at least one facility in which a service is provided by the service provider using a service providing apparatus;
  a processor operatively coupled to the memory, the processor being programmed to:
    generate a link ID that is an identifier for identifying the user;
    cause a terminal apparatus of the user to transmit the link ID to the service providing apparatus;
    cause the service providing apparatus to associate a management-side user ID that identifies the user in the management apparatus with a providing-side user ID used that identifies the user in the service providing apparatus based on the link ID in a case where a use request of the right is received from the terminal apparatus of the user;
    update the usable or non-usable state stored in the database to a non-usable state representing that the right is non-usable in a case where the use request of the right is received from the terminal apparatus of the user and transmit the use request to the terminal apparatus or the service providing apparatus;
    permit the use of the right to the user by updating the usable or non-usable state in the database to a usable state representing that the right is usable in a case where a notification of satisfaction is received from the terminal apparatus or the service providing apparatus, the notification of satisfaction indicating that the user, who requests the use of the right in the use request, satisfies a use requirement of the right;
    receiving an identity verification input indicating whether the user is permitted to use the right in a case where a PIN system is not available; and
    in response the identity verification input identifying the user as being permitted to use the right, generating a state changing request to change the usable or non-usable state stored in the database to a useable state.

2. The management apparatus according to claim 1, wherein
  the processor permits the use of the right to the user in a case where a notification, which indicates that the user is verified by the service provider, is received as the notification of satisfaction.

3. The management apparatus according to claim 1, wherein:
  the processor is further programmed to:
    store a permission condition for permitting the use of the right in the facility for each facility, and permit the use of the right to the user regardless whether the notification of satisfaction is received in a case where the permission condition corresponding to the facility, for which the use of the right is requested in the use request, represents that the user does not need to be verified.

4. The management apparatus according to claim 3, wherein:
the permission condition including an update condition for permitting an update of a period during which the right is usable is stored in the memory, and
the processor invalidates the right by updating the usable or non-usable state to the non-usable state in a case where the right permitted to be used to the user does not satisfy the update condition stored in the memory.

5. The management apparatus according to claim 4, wherein the processor notifies the terminal apparatus of a condition for not satisfying the update condition before the right does not satisfy the update condition.

6. The management apparatus according claim 1, wherein the processor permits the use of the right to the user regardless whether the notification of satisfaction is received in a case where a permission condition corresponding to the facility for which the use of the right is requested in the use request is lower than other permission condition satisfied by the user in the past.

7. The management apparatus according to claim 1, wherein:
the processor is further programmed to:
associate correspondence information corresponding to a management-side user ID used for identifying the user in the management apparatus with the management-side user ID in a case where the use request is received from the terminal apparatus, and
cause the correspondence information to be associated with a providing-side user ID used for identifying the user in the service providing apparatus by transmitting the use request including the correspondence information.

8. The management apparatus according to claim 7, wherein:
the processor is further programmed to:
authenticate the user using the management-side user ID, and
update the usable or non-usable state to the non-usable state and transmit the use request to the terminal apparatus or the service providing apparatus in a case where the use request is received from the terminal apparatus of the user that is authenticated.

9. A membership managing method performed by a management apparatus and for use with a user in at least one facility by a service provider, the membership managing method comprising:
generating a link ID that is an identifier for identifying the user;
causing a terminal apparatus of the user to transmit the link ID to the service providing apparatus;
causing a service providing apparatus to associate a management-side user ID that identifies the user in the management apparatus with a providing-side user ID used that identifies the user in the service providing apparatus based on the link ID in a case where a use request of the right is received from the terminal apparatus of the user;
updating a usable or non-usable state in a database of the management apparatus, which represents whether a right is usable or non-usable by the user in the facility in which a service is provided by the service provider using the service providing apparatus, to a non-usable state representing that the right is non-usable in a case where the use request of the right is received from a terminal apparatus used by the user;
transmitting the use request to the terminal apparatus or the service providing apparatus;
permitting the use of the right to the user by updating the usable or non-usable state in the database to a usable state representing that the right is usable in a case where a notification of satisfaction is received from the terminal apparatus or the service providing apparatus, the notification of satisfaction indicating that the user, who requests the use of the right in the use request transmitted at the transmitting, satisfies a use requirement of the right;
receiving an identity verification input indicating whether the user is permitted to use the right in a case where a PIN system is not available; and
in response the identity verification input identifying the user as being permitted to use the right, generating a state changing request to change the usable or non-usable state stored in the database to a useable state.

10. The membership managing method according to claim 9, wherein the permitting includes permitting the use of the right to the user in a case where a notification, which indicates that the user is verified by the service provider, is received as the notification of satisfaction.

11. The membership managing method according to claim 9, wherein the permitting includes permitting the use of the right to the user regardless whether the notification of satisfaction is received in a case where a permission condition for permitting the use of the right in the facility for which the use of the right is requested in the use request, the permission condition representing that the user does not need to be verified.

12. The membership managing method according to claim 11, wherein the permitting includes invalidating the right by updating the usable or non-usable state to the non-usable state in a case where the right permitted to be used to the user does not satisfy an update condition for permitting an update of a period during which the right is usable, the update condition included in the permission condition.

13. The membership managing method according to claim 12, wherein the permitting includes notifying the terminal apparatus of a condition for not satisfying the update condition before the right does not satisfy the update condition.

14. The membership managing method according claim 9, wherein the permitting includes permitting the use of the right to the user regardless whether the notification of satisfaction is received in a case where a permission condition corresponding to the facility for which the use of the right is requested in the use request is lower than other permission condition satisfied by the user in the past.

15. The membership managing method according to claim 9, further comprising:
associating correspondence information corresponding to a management-side user ID used for identifying the user in the management apparatus with the management-side user ID in a case where the use request is received from the terminal apparatus, wherein
the transmitting includes causing the correspondence information to be associated with a providing-side user ID used for identifying the user in the service providing apparatus by transmitting the use request including the correspondence information.

16. The management apparatus according to claim 15, further comprising:
authenticating the user using the management-side user ID, wherein
the updating includes updating the usable or non-usable state to the non-usable state, and
the transmitting includes transmitting the use request to the terminal apparatus or the service providing apparatus in a case where the use request is received from the terminal apparatus of the user that is authenticated at the authenticating.

17. A service providing apparatus used by a service provider providing a service in a facility, the service providing apparatus comprising:
a processor programmed to:
receive a use request that is transmitted after a usable or non-usable state representing whether a right is usable or non-usable by a user in the facility is updated to a non-usable state in a database of a management apparatus representing that the right is non-usable by the managing apparatus receiving the use request of the right to be used by the user from the terminal apparatus of the user;
generate a link ID that is an identifier for identifying the user;
cause a terminal apparatus of the user to transmit the link ID to the service providing apparatus;
cause the service providing apparatus to associate a management-side user ID that identifies the user in the management apparatus with a providing-side user ID used that identifies the user in the service providing apparatus based on the link ID in a case where a use request of the right is received from the terminal apparatus of the user;
cause the management apparatus to update the usable or non-usable state in the database of the management apparatus to a usable state representing that the right is usable by transmitting a notification of satisfaction indicating that use requirements are satisfied to the terminal apparatus or the management apparatus in a case where the user requesting the use of the right in the use request satisfies the use requirement of the right;
receiving an identity verification input indicating whether the user is permitted to use the right in a case where a PIN system is not available; and
in response the identity verification input identifying the user as being permitted to use the right, generating a state changing request to change the usable or non-usable state stored in the database to a useable state.

* * * * *